United States Patent
Tamura et al.

(10) Patent No.: US 10,491,825 B2
(45) Date of Patent: Nov. 26, 2019

(54) IMAGING UNIT AND IMAGING APPARATUS WITH ROTATABLE LENS GROUP FOR OPTICAL VIBRATION ISOLATION

(71) Applicant: SONY CORPORATION, Tokyo (JP)

(72) Inventors: Masaki Tamura, Kanagawa (JP); Daigo Katsuragi, Kanagawa (JP); Yasuhide Nihei, Kanagawa (JP); Fujio Kanai, Kanagawa (JP); Kazuki Sakae, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/564,234

(22) PCT Filed: Mar. 11, 2016

(86) PCT No.: PCT/JP2016/057728
§ 371 (c)(1),
(2) Date: Oct. 4, 2017

(87) PCT Pub. No.: WO2016/167063
PCT Pub. Date: Oct. 20, 2016

(65) Prior Publication Data
US 2018/0131874 A1 May 10, 2018

(30) Foreign Application Priority Data

Apr. 15, 2015 (JP) .................. 2015-083177

(51) Int. Cl.
*H04N 5/232* (2006.01)
*G02B 13/04* (2006.01)
(Continued)

(52) U.S. Cl.
CPC .......... *H04N 5/23287* (2013.01); *G02B 7/04* (2013.01); *G02B 13/0045* (2013.01);
(Continued)

(58) Field of Classification Search
CPC .. H04N 5/23287; G02B 7/04; G02B 13/0045; G02B 13/04; G02B 27/646; G03B 5/06; G03B 2205/0023
See application file for complete search history.

(56) References Cited

U.S. PATENT DOCUMENTS 8,390,941 B2 * 3/2013 Shinohara .......... G02B 13/0045
359/714
2008/0088951 A1 * 4/2008 Nakanishi .......... G02B 13/0035
359/785
(Continued)

FOREIGN PATENT DOCUMENTS

CN 102298200 A 12/2011
CN 104076495 A 10/2014
(Continued)

OTHER PUBLICATIONS

International Search Report and Written Opinion of PCT Application No. PCT/JP2016/057728, dated Jun. 7, 2016, 09 pages of ISRWO.

(Continued)

*Primary Examiner* — Antoinette T Spinks
(74) *Attorney, Agent, or Firm* — Chip Law Group

(57) ABSTRACT

An imaging unit of the disclosure includes an imaging lens including a first lens group and a second lens group that are disposed in order from object side toward image side, and an imaging device that converts an optical image formed by the imaging lens into an electric signal. The second lens group and the imaging device are rotationally moved integrally to allow the second lens group and the imaging device to be tilted with respect to an optical axis of the first lens group.

15 Claims, 27 Drawing Sheets

(51) Int. Cl.
*G02B 7/04* (2006.01)
*G02B 27/64* (2006.01)
*G03B 5/06* (2006.01)
*G02B 13/00* (2006.01)

(52) U.S. Cl.
CPC ........... *G02B 13/04* (2013.01); *G02B 27/646* (2013.01); *G03B 5/06* (2013.01); *G03B 2205/0023* (2013.01)

(56) References Cited

U.S. PATENT DOCUMENTS

| 2010/0254688 | A1* | 10/2010 | Masuda | G03B 17/00 396/55 |
| 2011/0317281 | A1 | 12/2011 | Take | |
| 2014/0293438 | A1 | 10/2014 | Miyazawa | |
| 2015/0309289 | A1* | 10/2015 | Nakamura | A61B 1/00096 359/740 |
| 2017/0285322 | A1* | 10/2017 | Inoue | G02B 23/243 |

FOREIGN PATENT DOCUMENTS

| JP | 07-333561 | A | | 12/1995 |
| JP | 08043729 | A | * | 2/1996 |
| JP | 08-220427 | A | | 8/1996 |
| JP | 2005-173372 | | | 6/2005 |
| JP | 2005-173372 | A | | 6/2005 |
| JP | 2010-025995 | A | | 2/2010 |
| JP | 2012-008264 | A | | 1/2012 |
| JP | 2012-008264 | A | | 10/2014 |
| JP | 2014-191163 | A | | 10/2014 |
| WO | 2015/016116 | A1 | | 2/2015 |

OTHER PUBLICATIONS

Office Action for JP Patent Application No. 2017-512236, dated Jun. 25, 2019, 05 pages of Office Action and 04 pages of English Translation.

Office Action for JP Patent Application No. 2017-512236, dated Oct. 15, 2019, 06 pages of Office Action and 04 pages of English Translation.

* cited by examiner

[ FIG. 1 ]
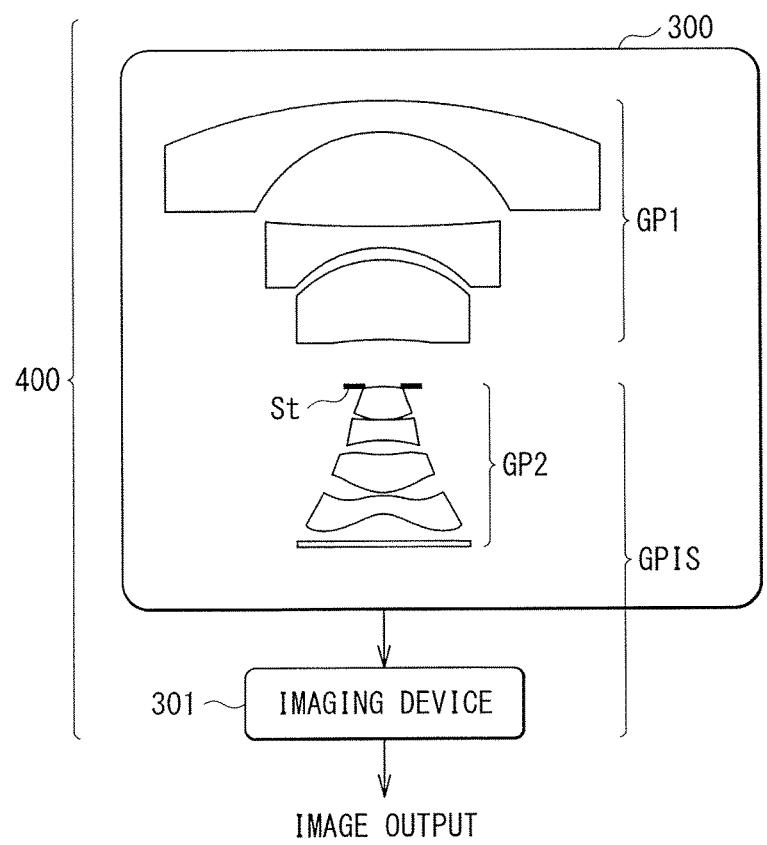

[FIG. 2]
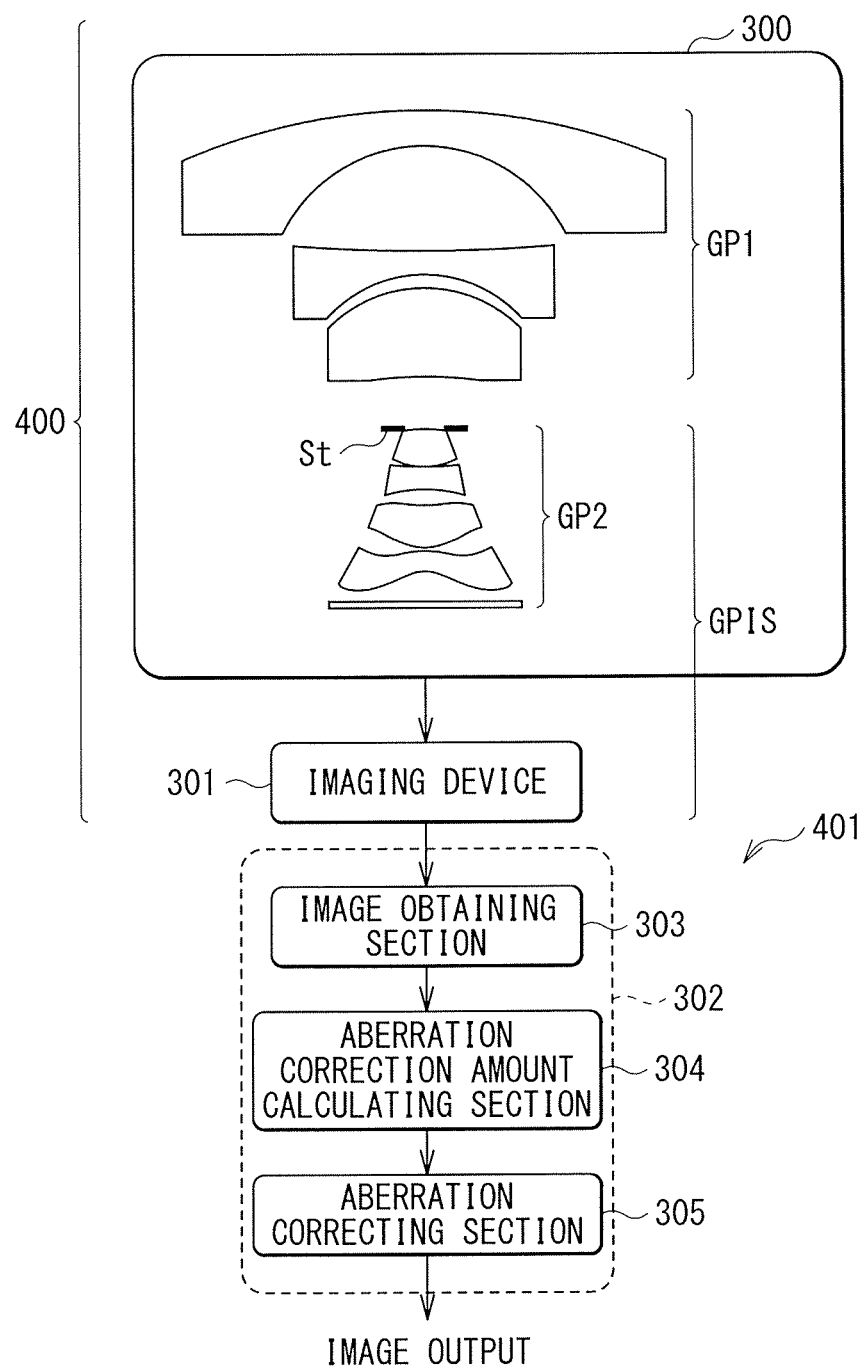

[FIG. 3]
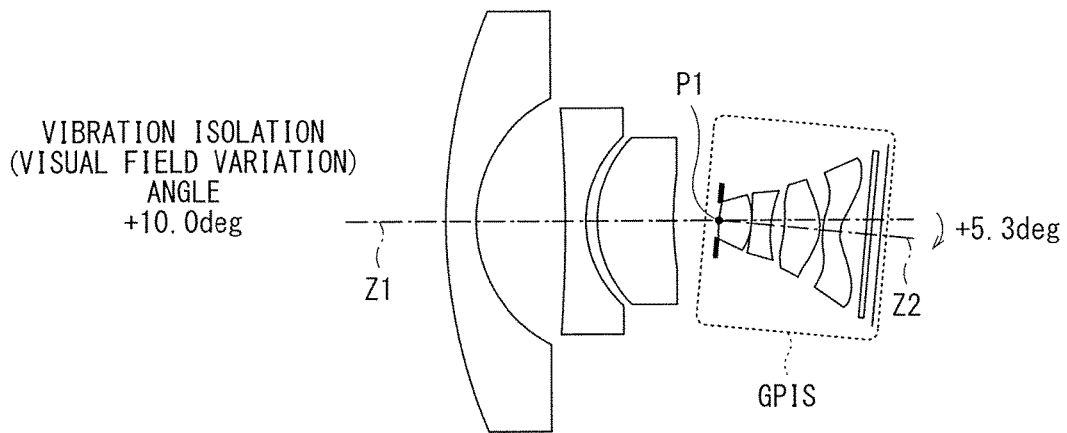
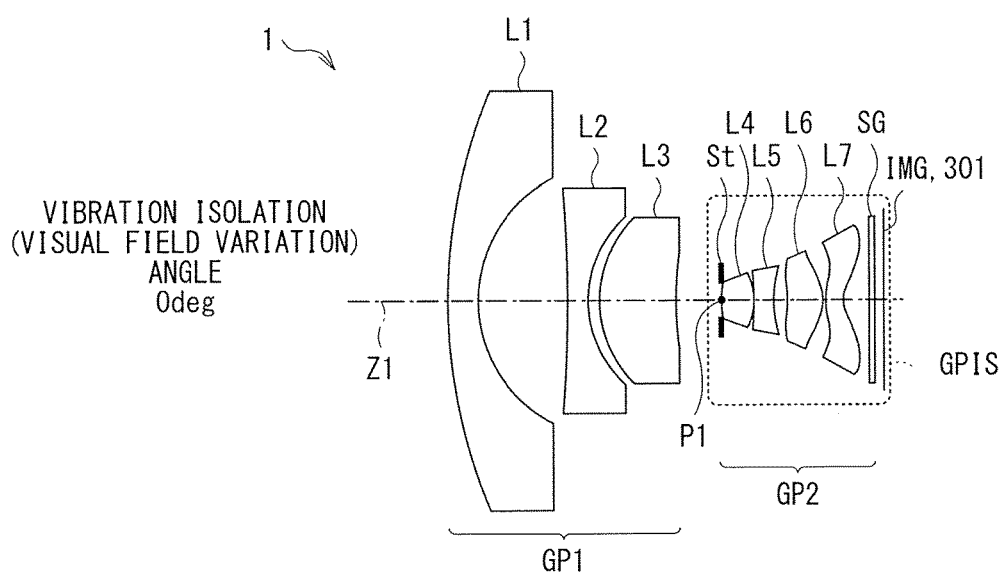
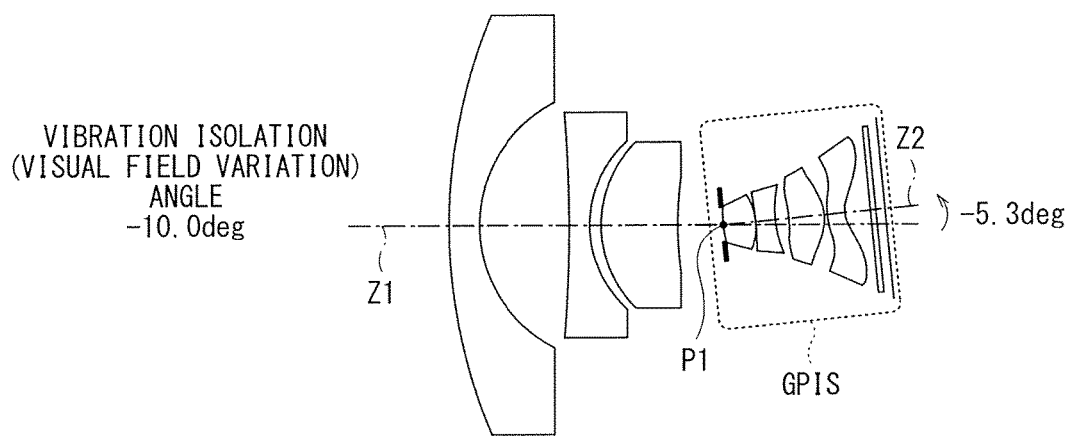

[FIG. 4]
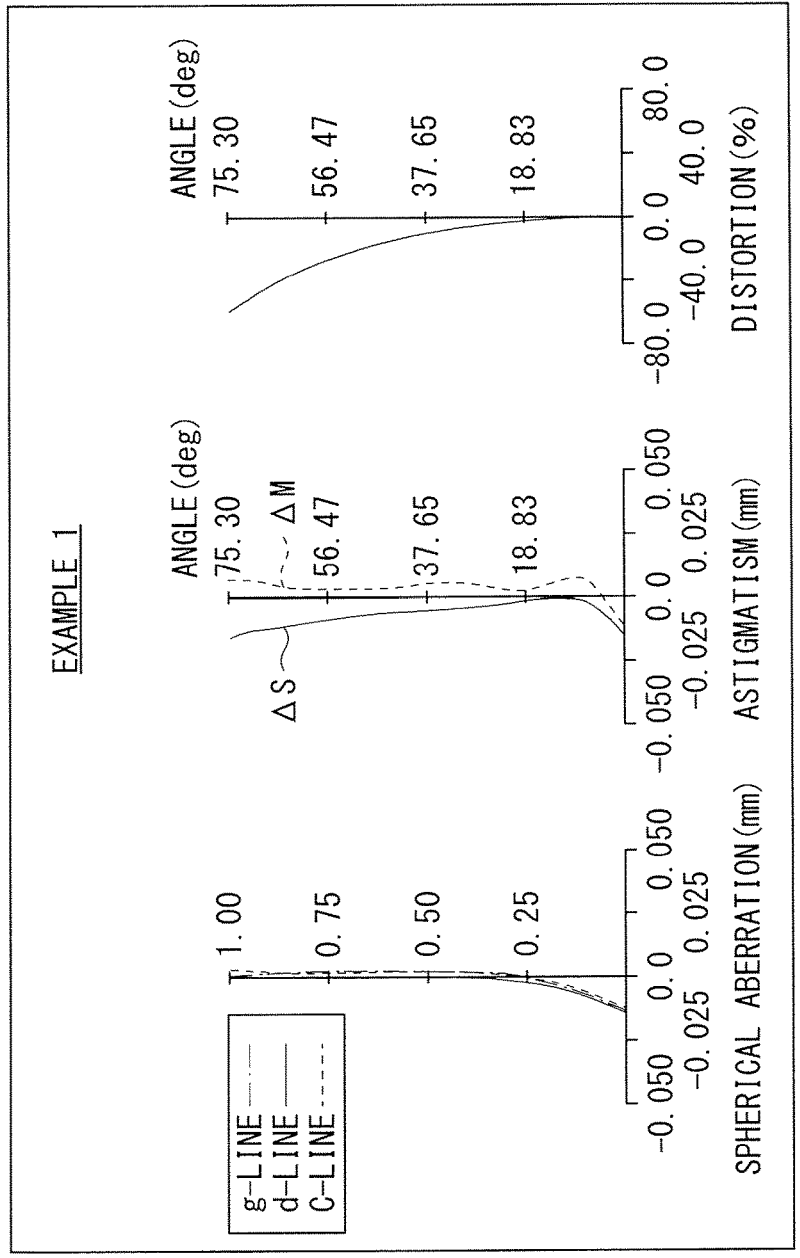

[ FIG. 5 ]
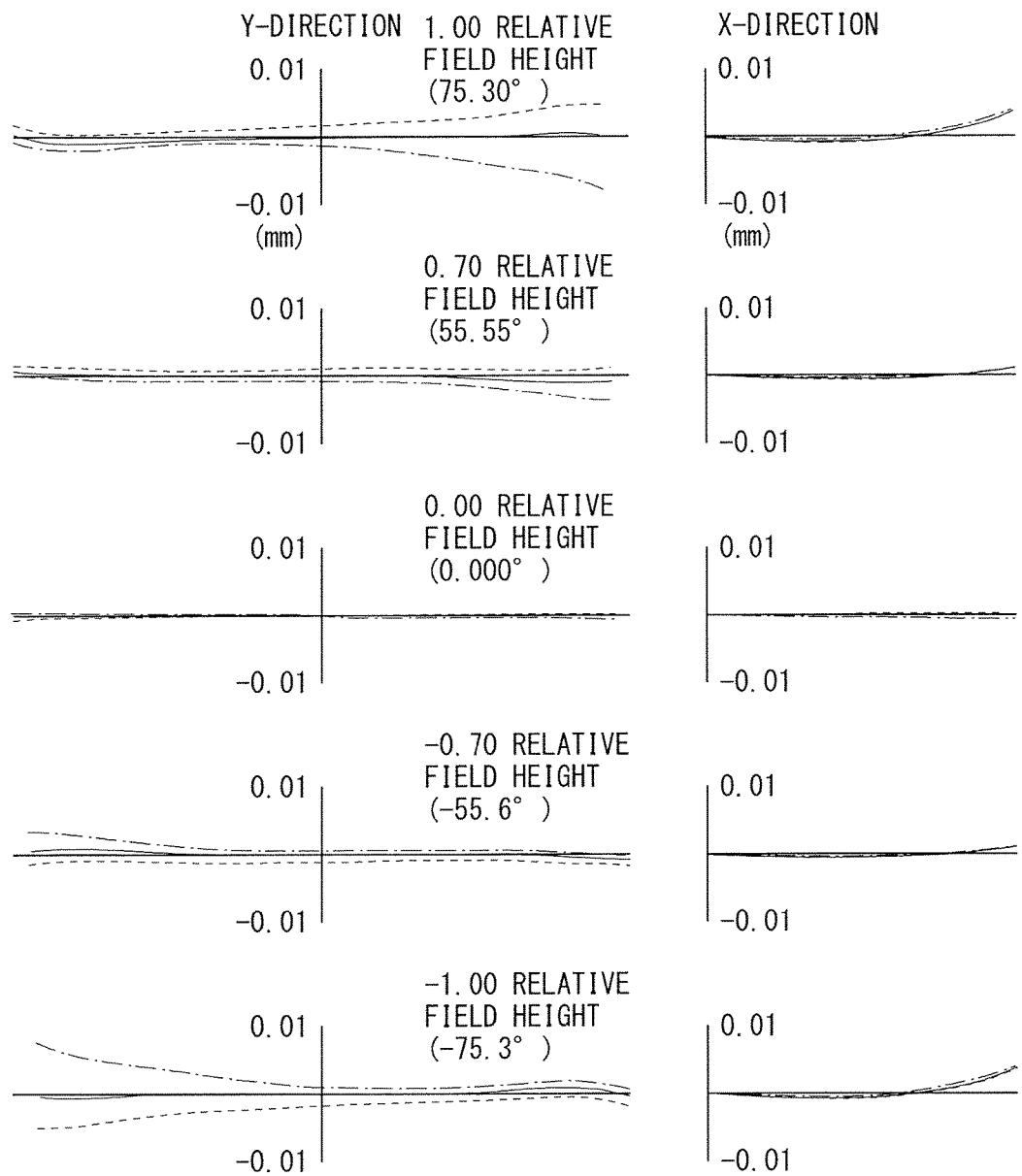

[ FIG.6 ]
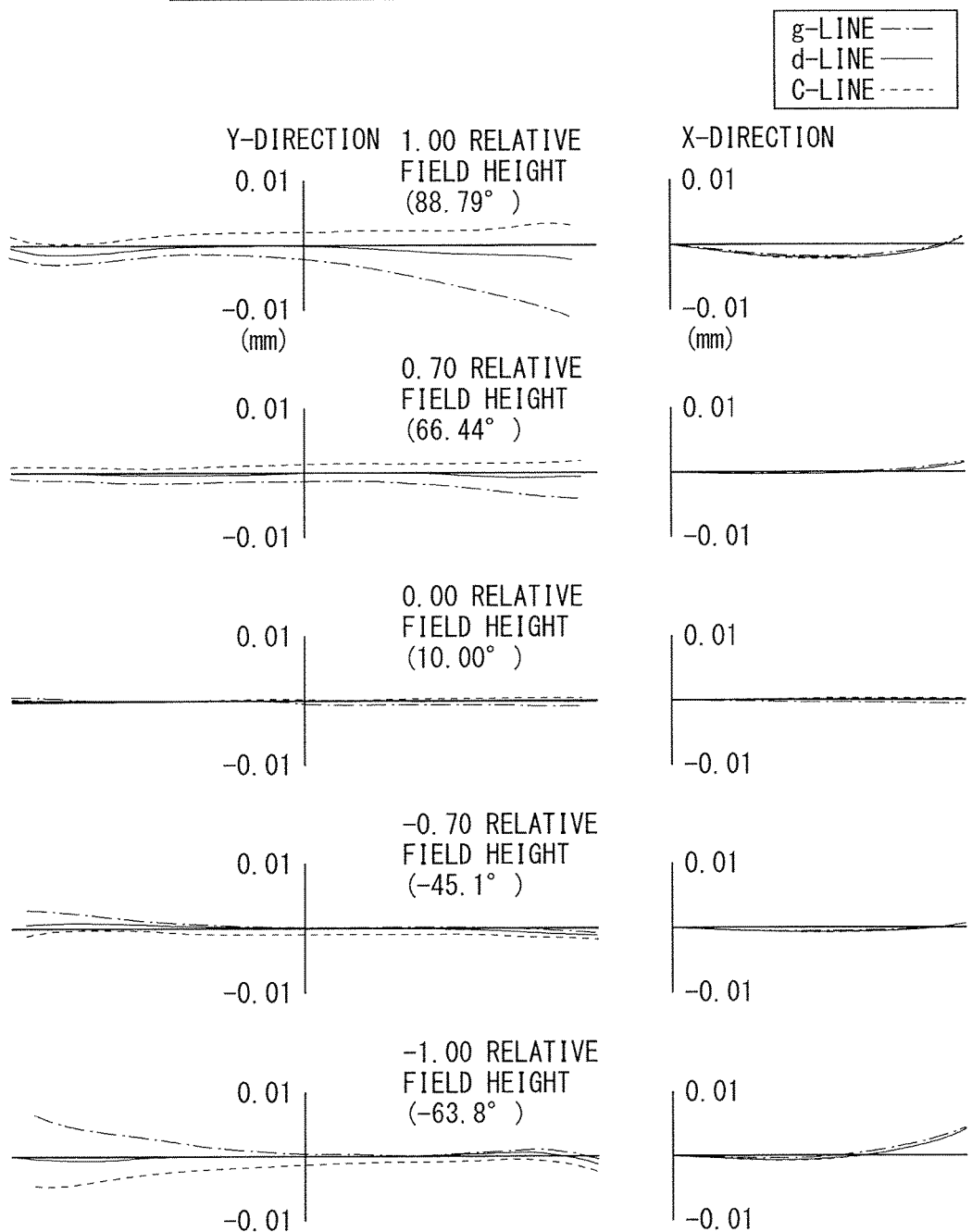

[FIG. 7]
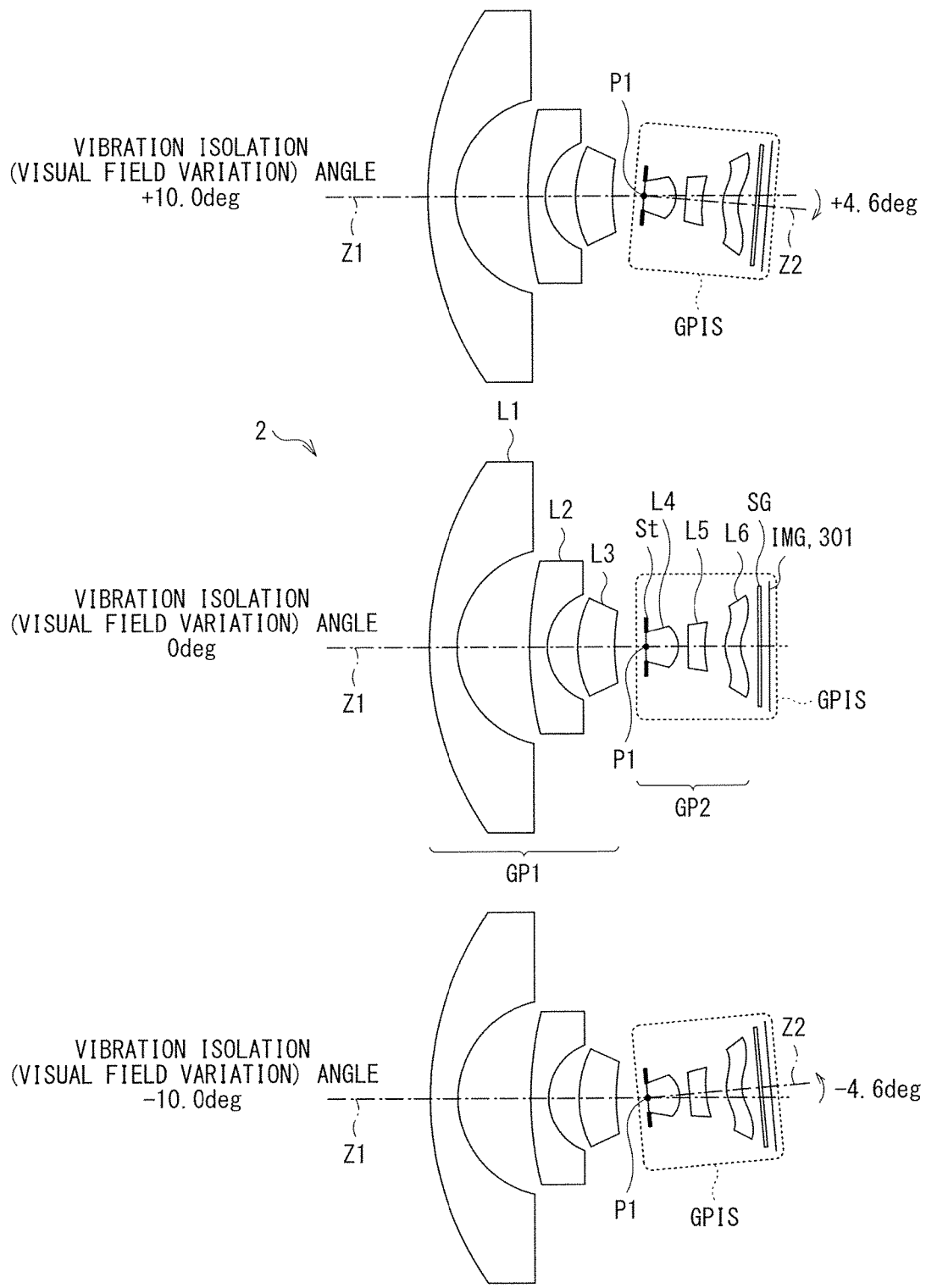

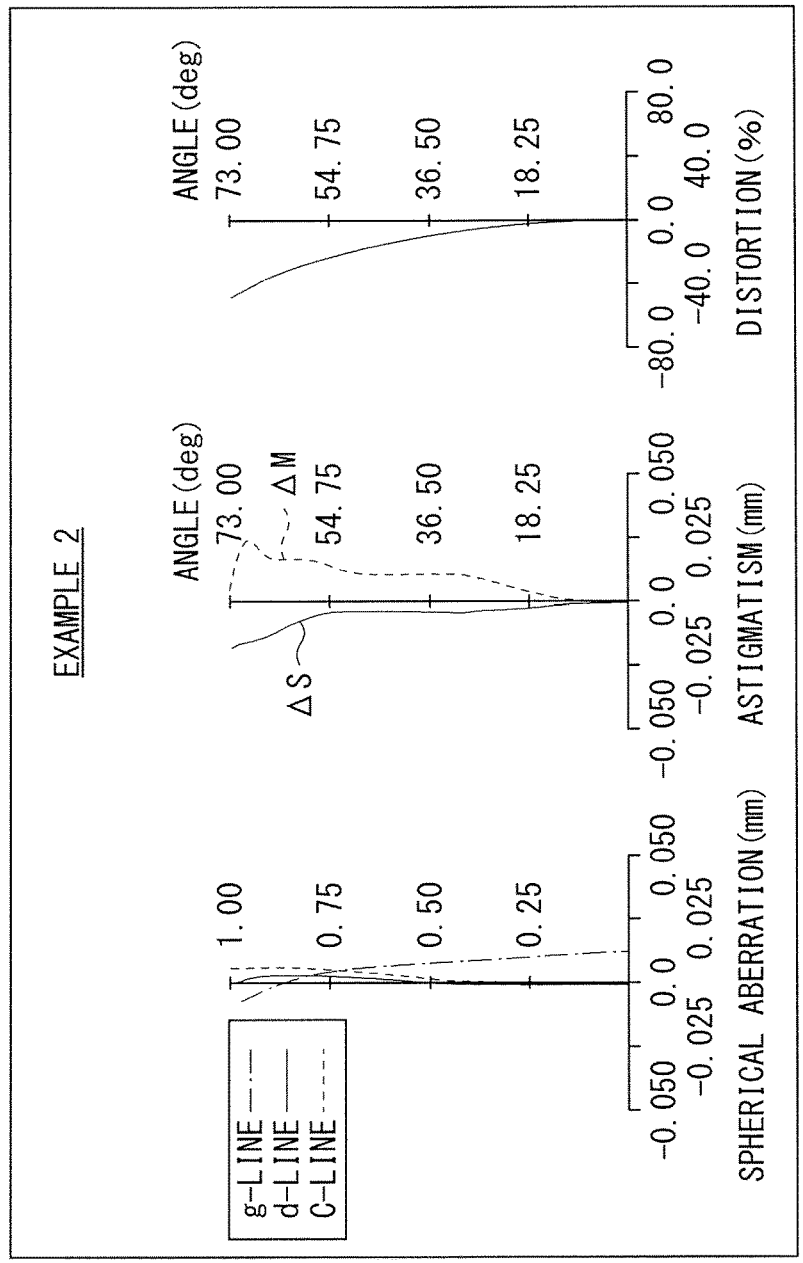
[FIG. 8]

[FIG. 9]
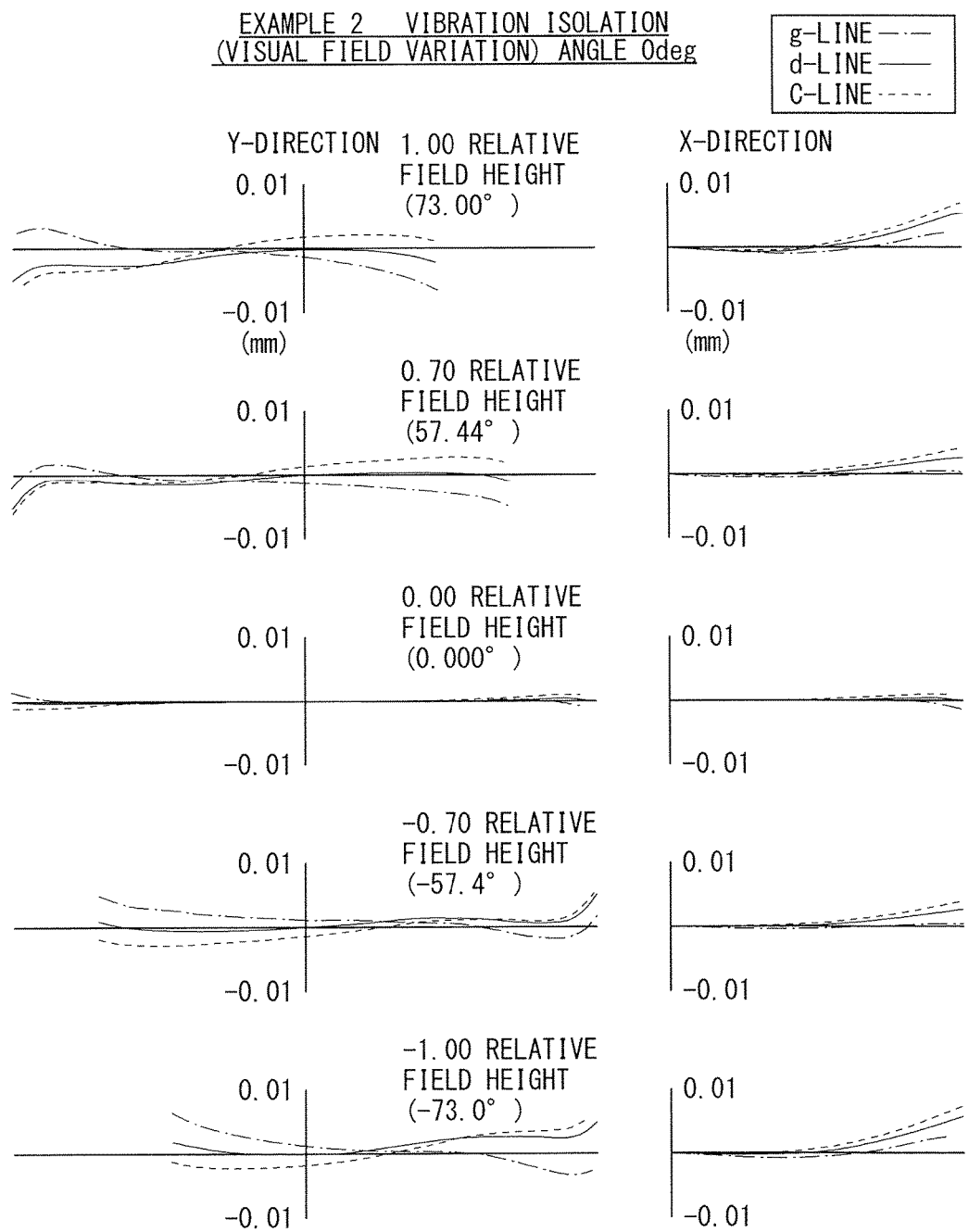

[ FIG. 10 ]
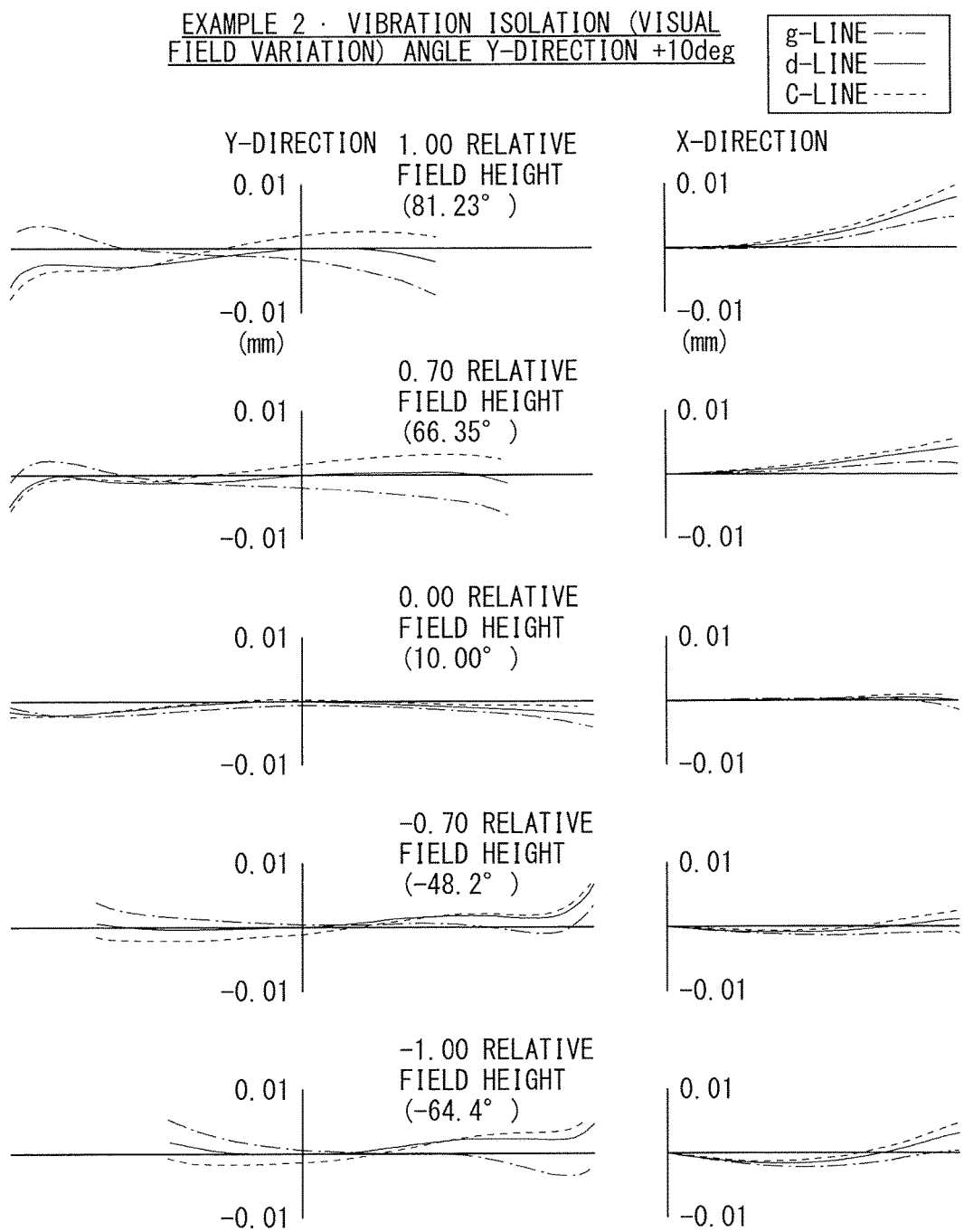

[ FIG. 11 ]
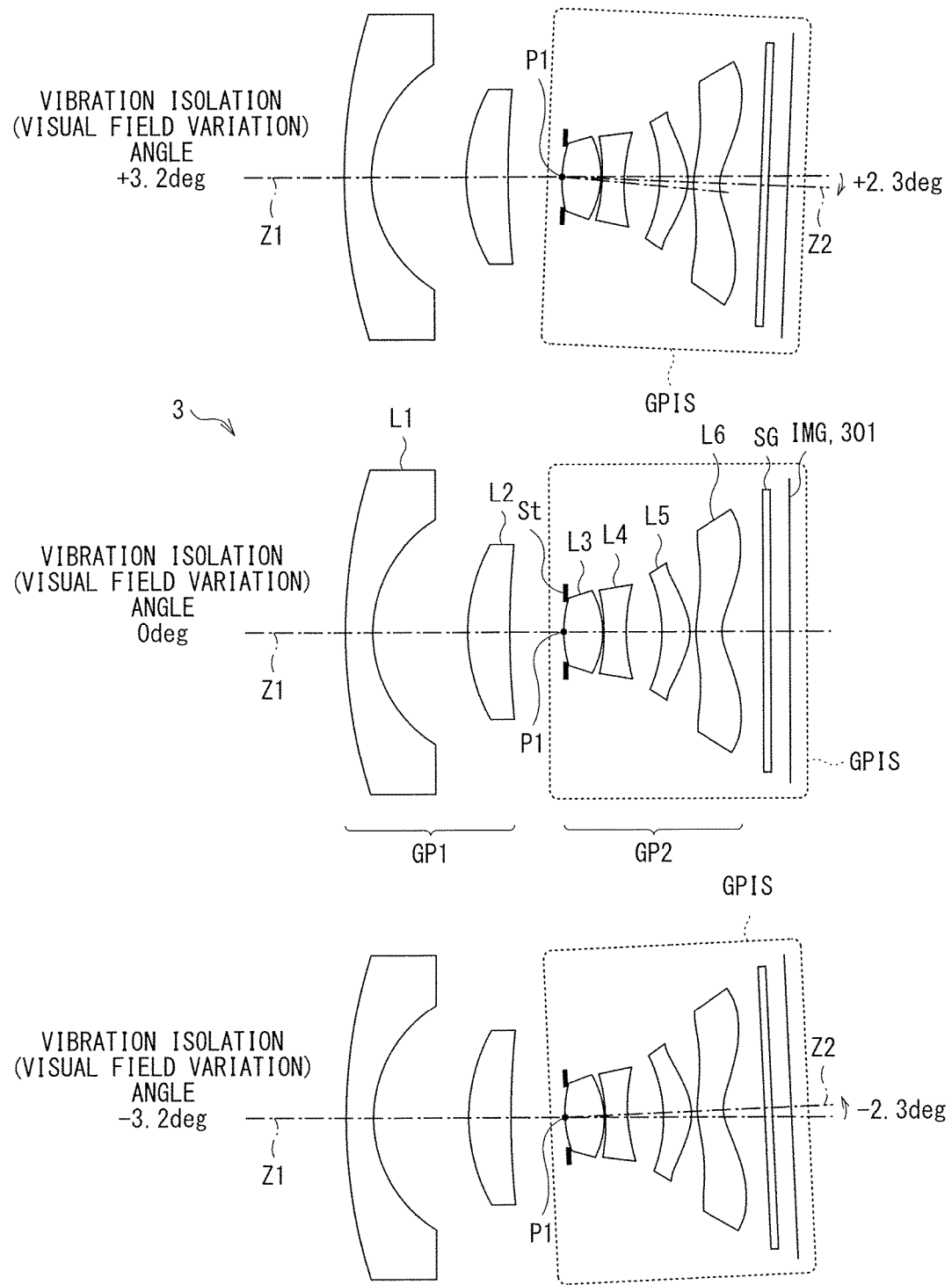

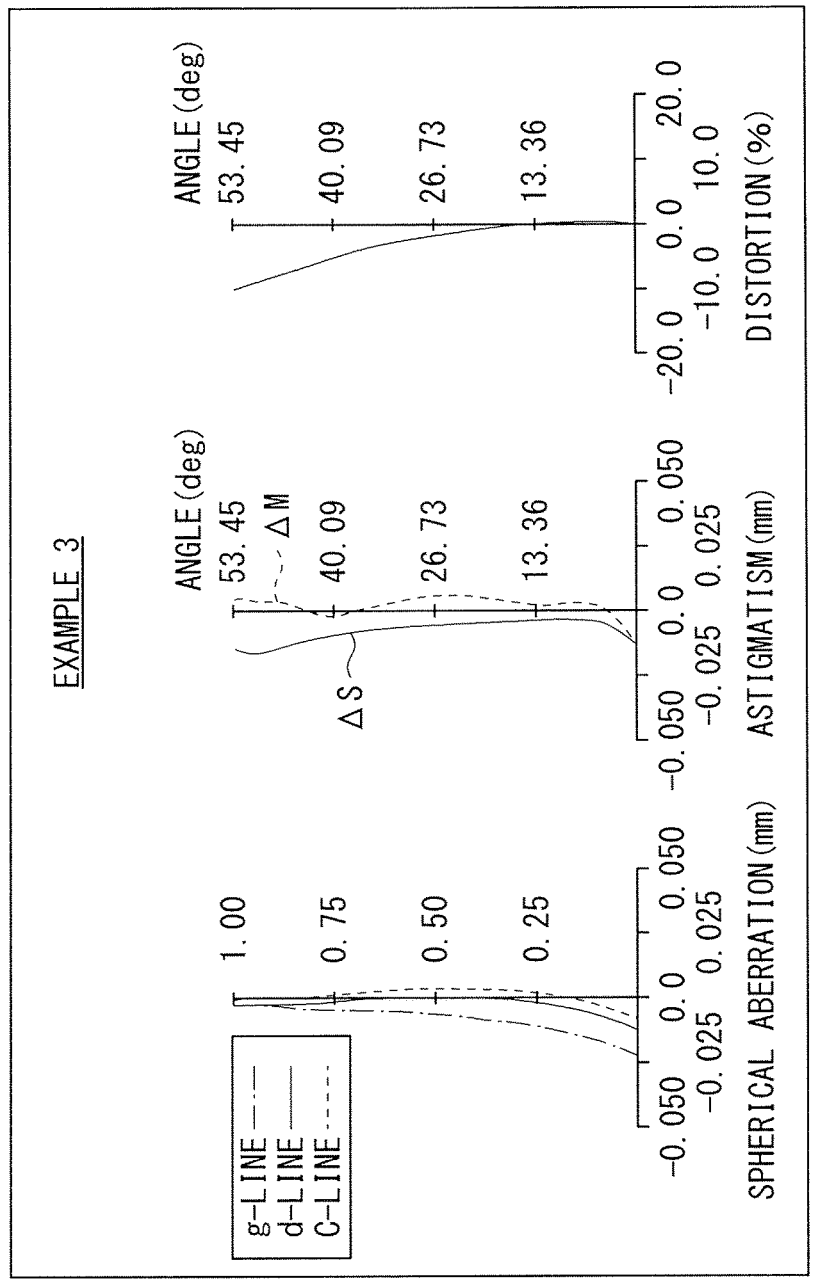
[FIG. 12]

[ FIG. 13 ]
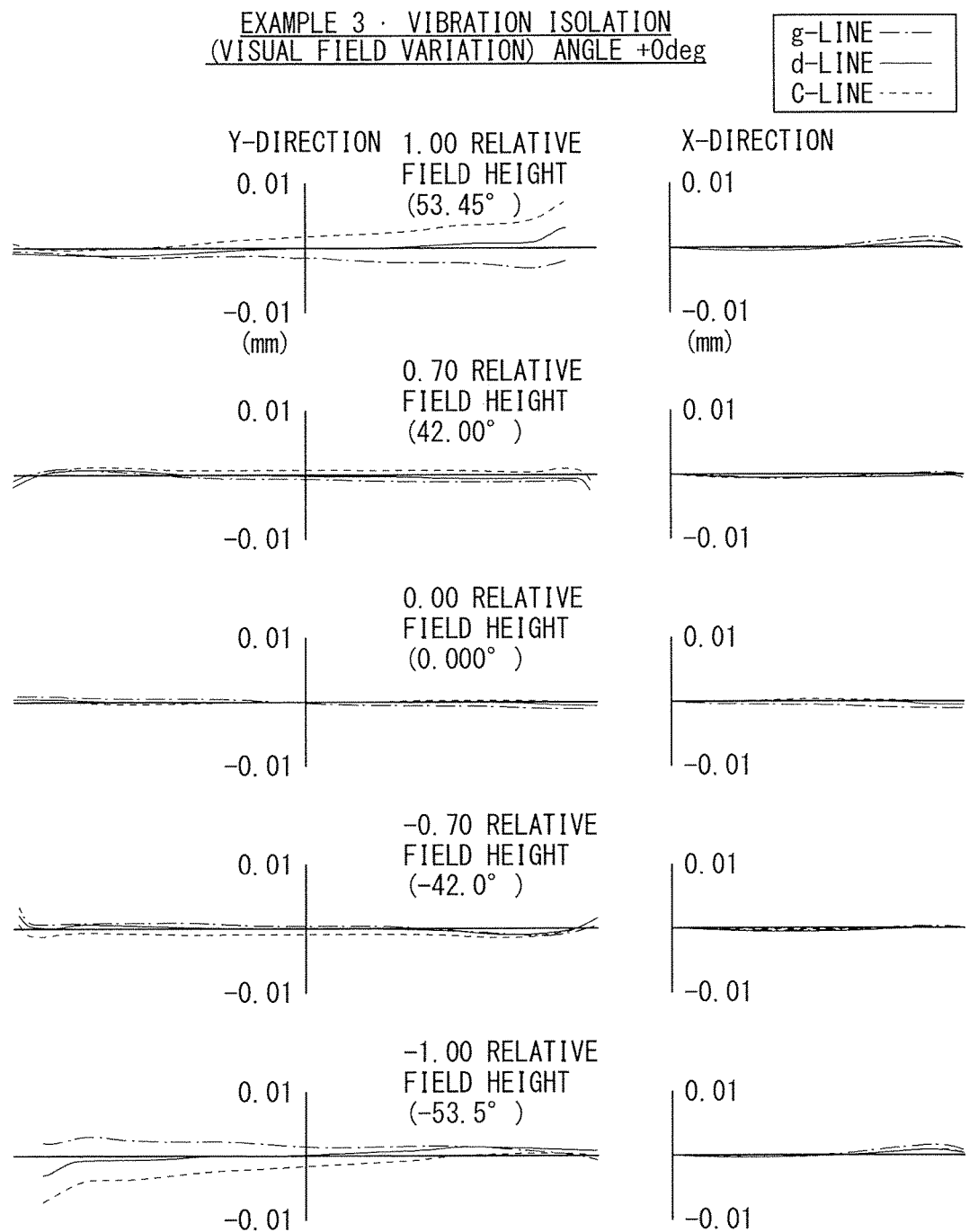

[ FIG. 14 ]
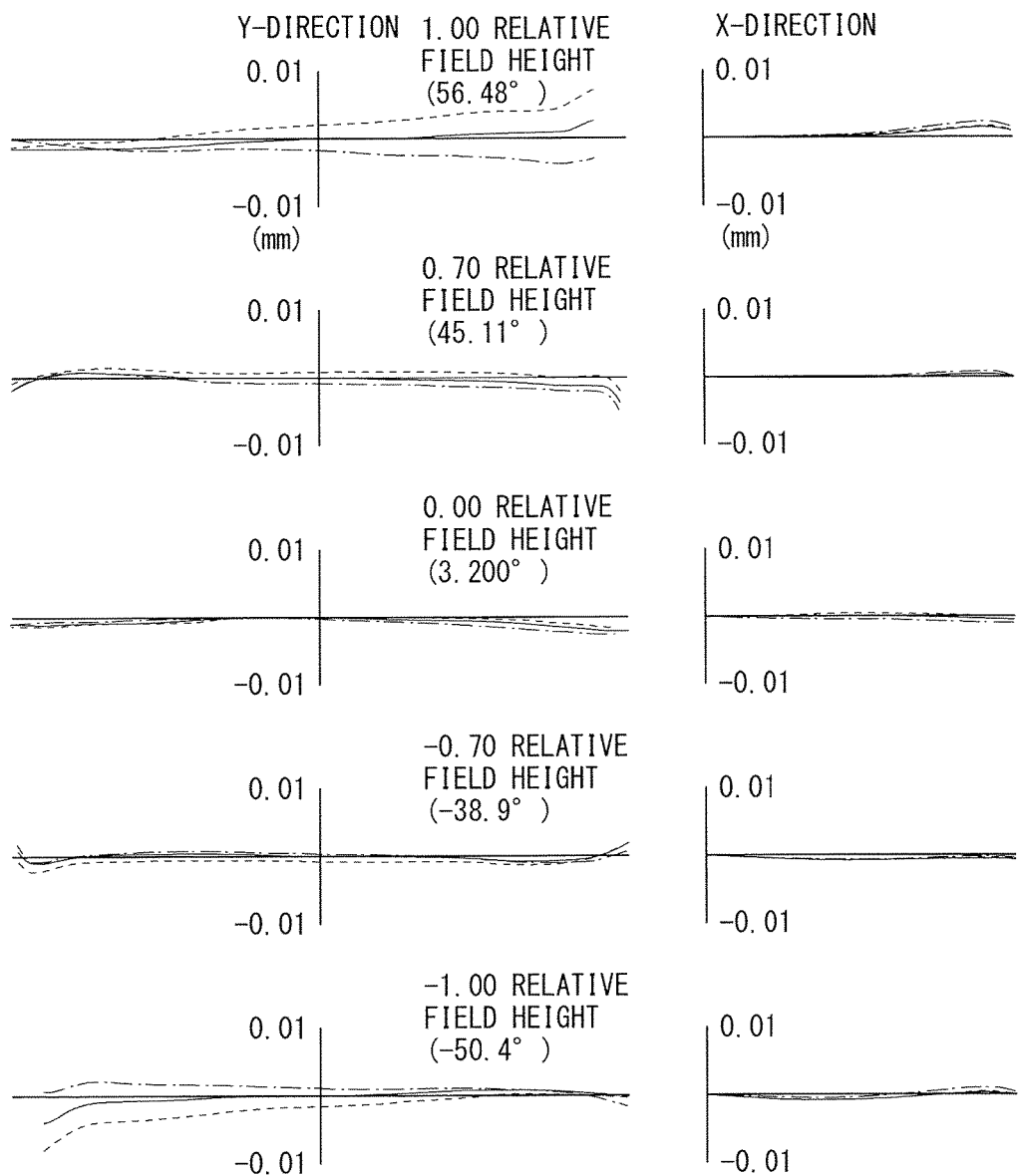

[ FIG. 15 ]
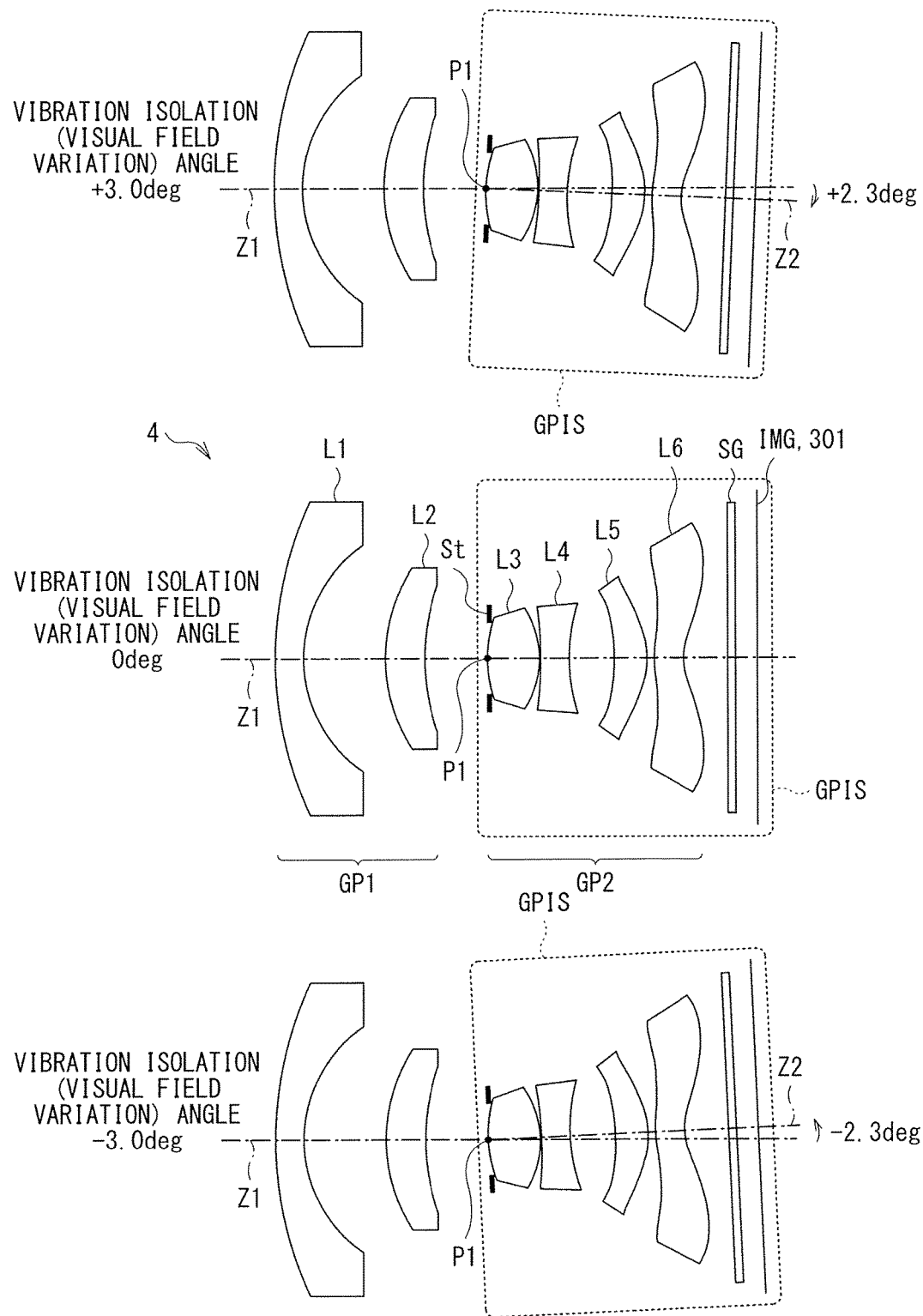

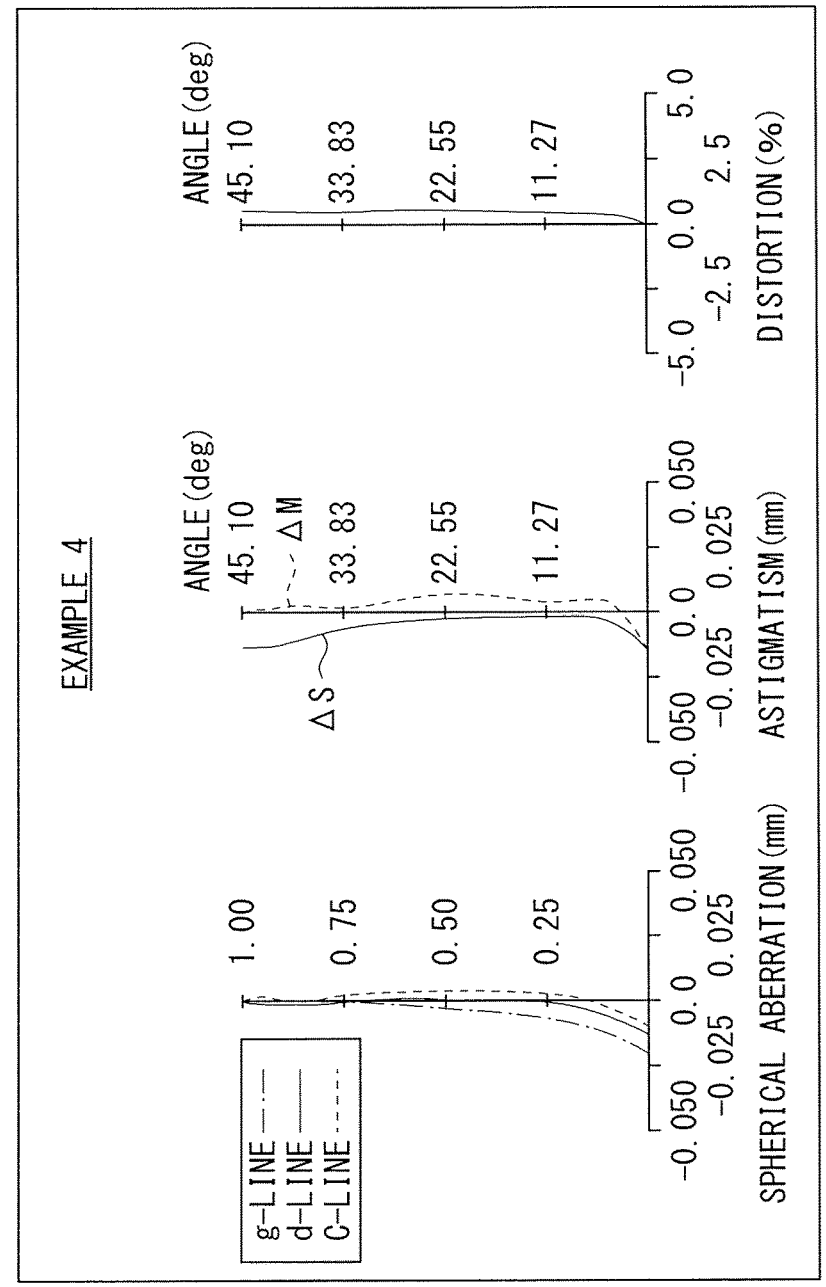
[FIG. 16]

[ FIG. 17 ]
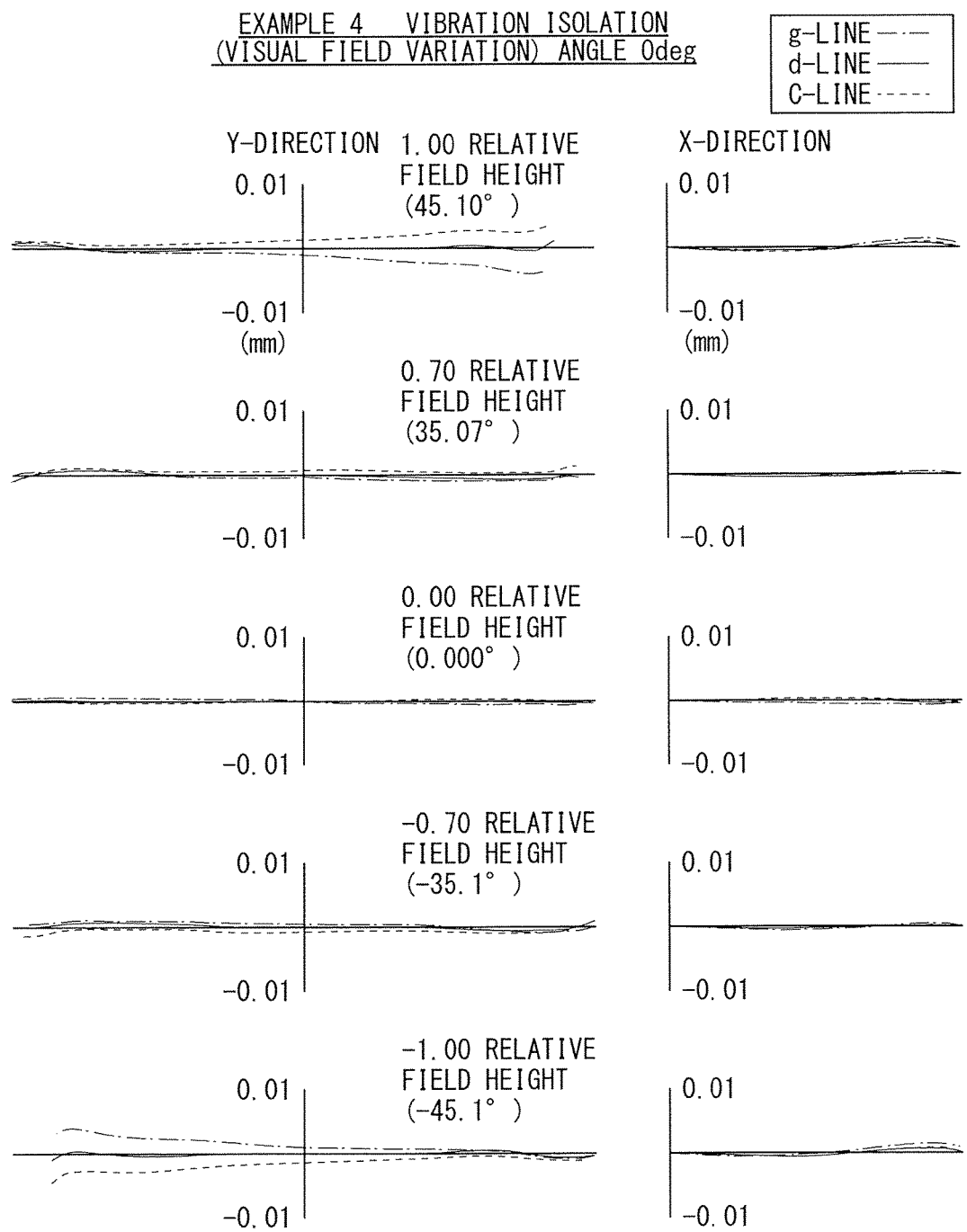

[ FIG. 18 ]
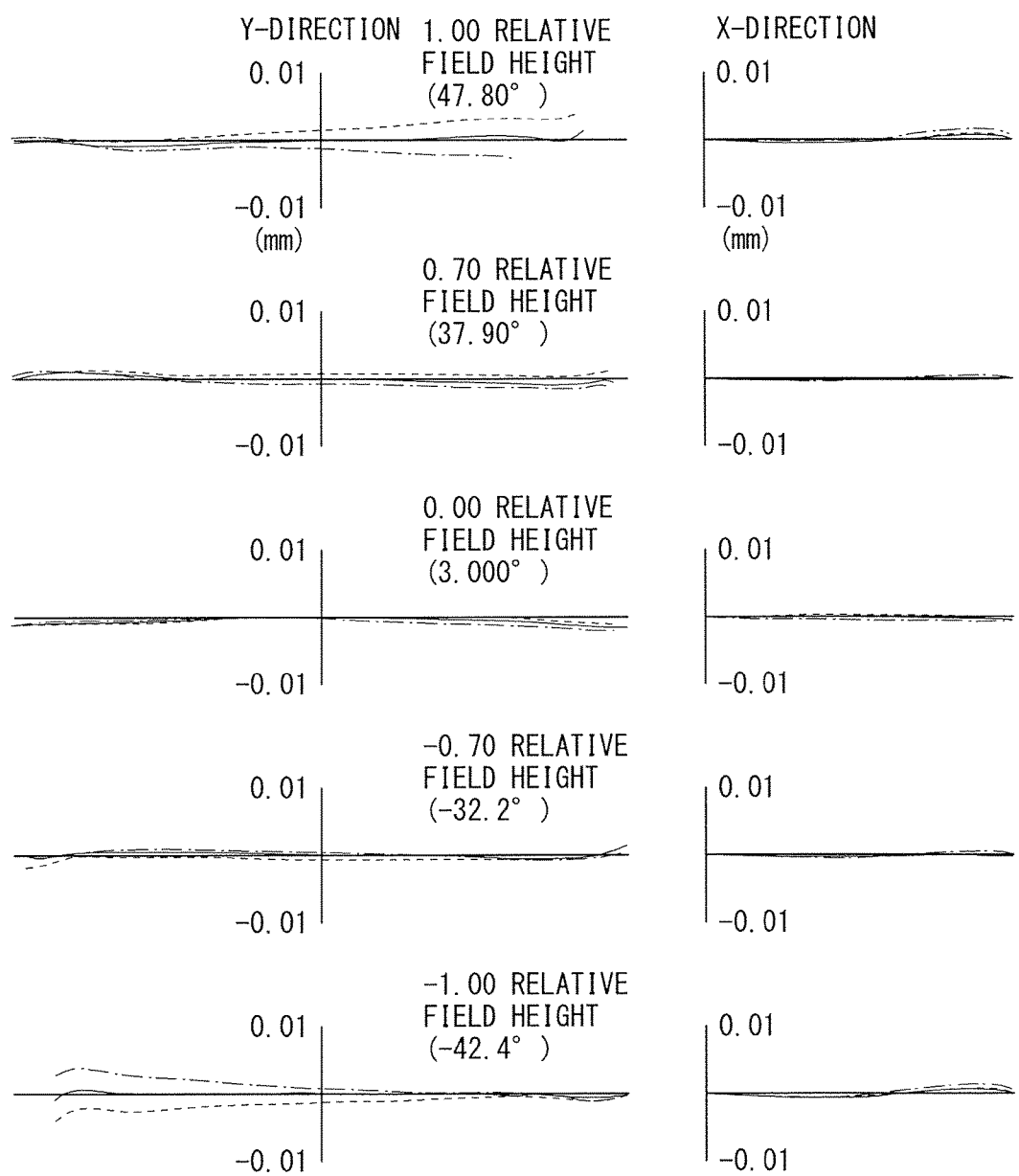

[ FIG. 19 ]
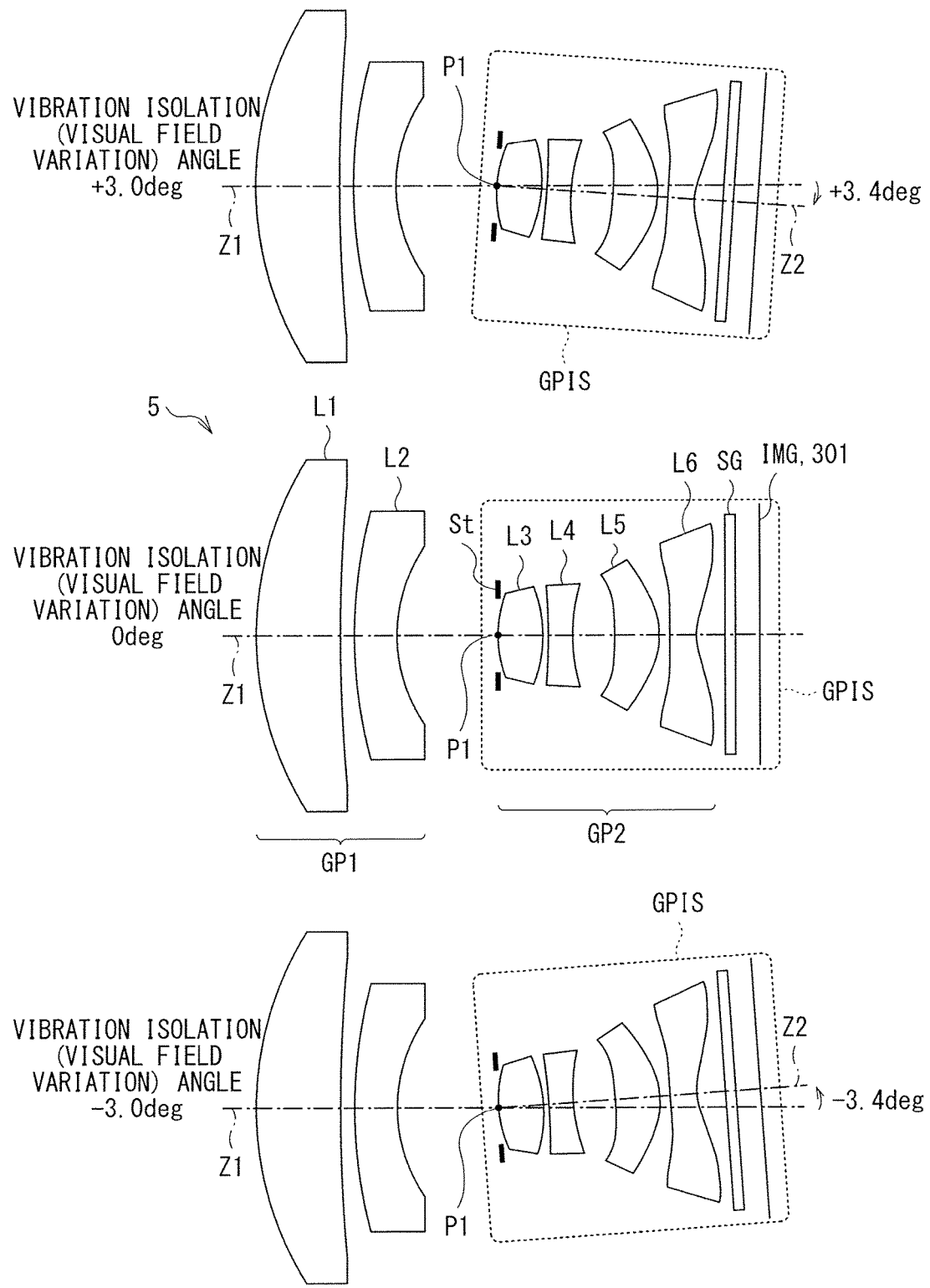

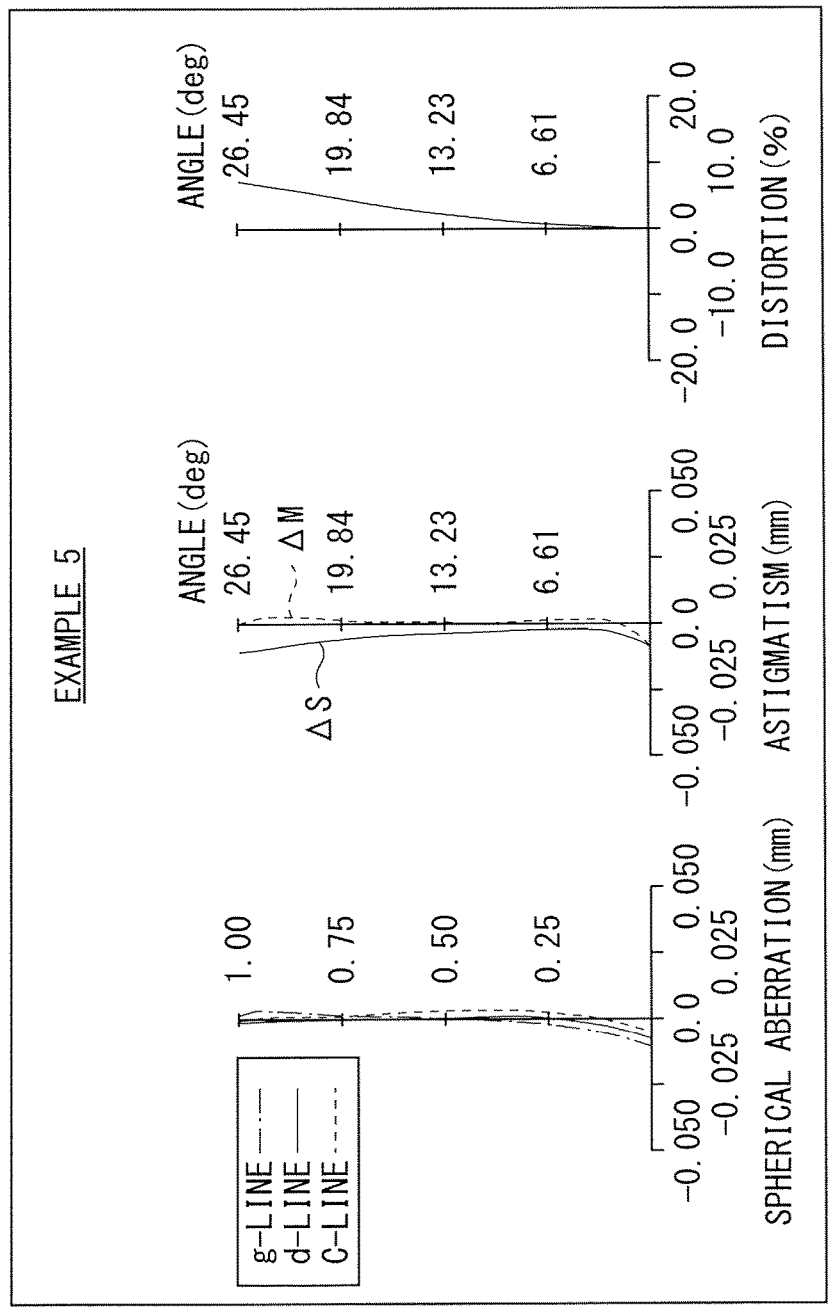

[ FIG. 21 ]
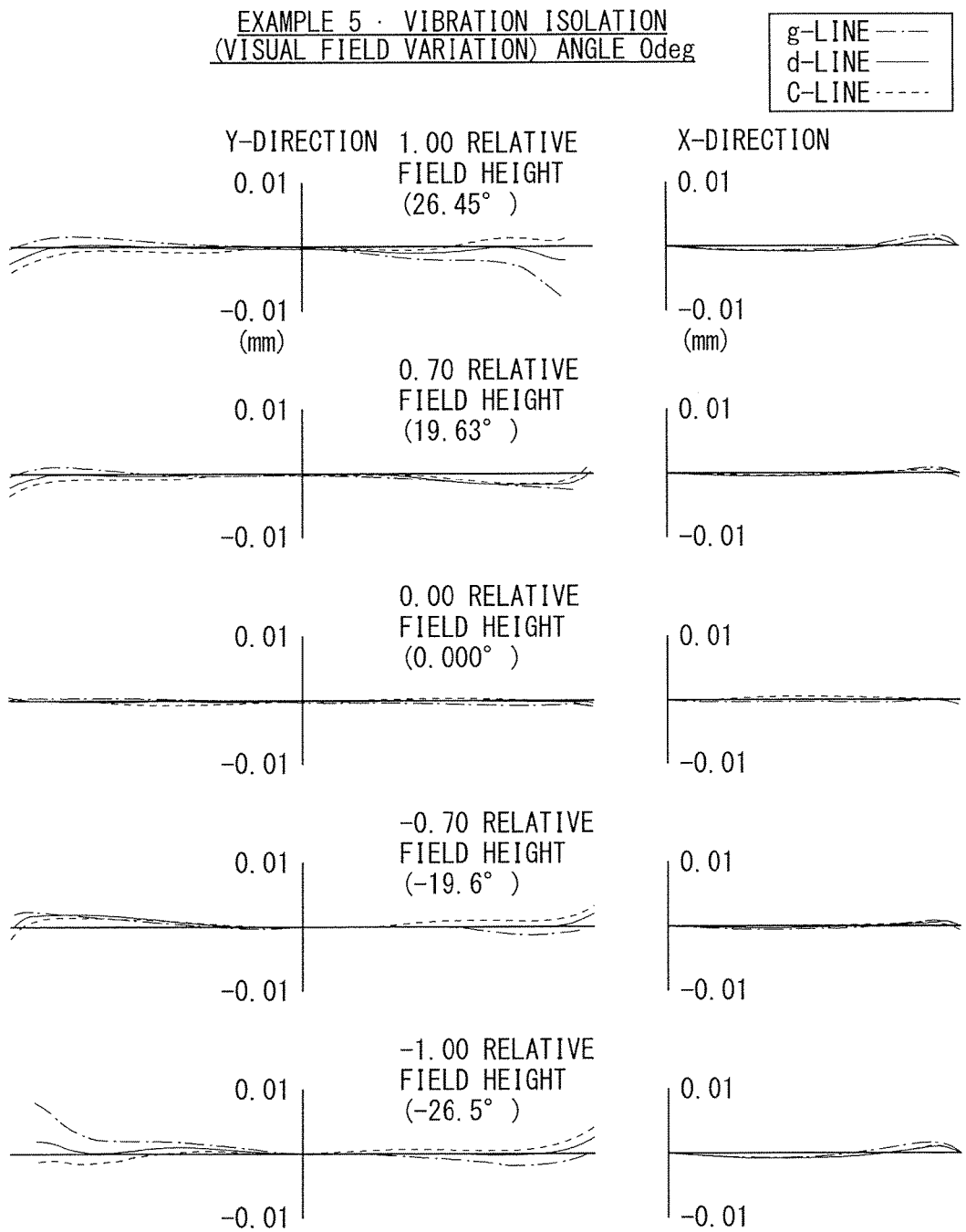

[ FIG. 22 ]
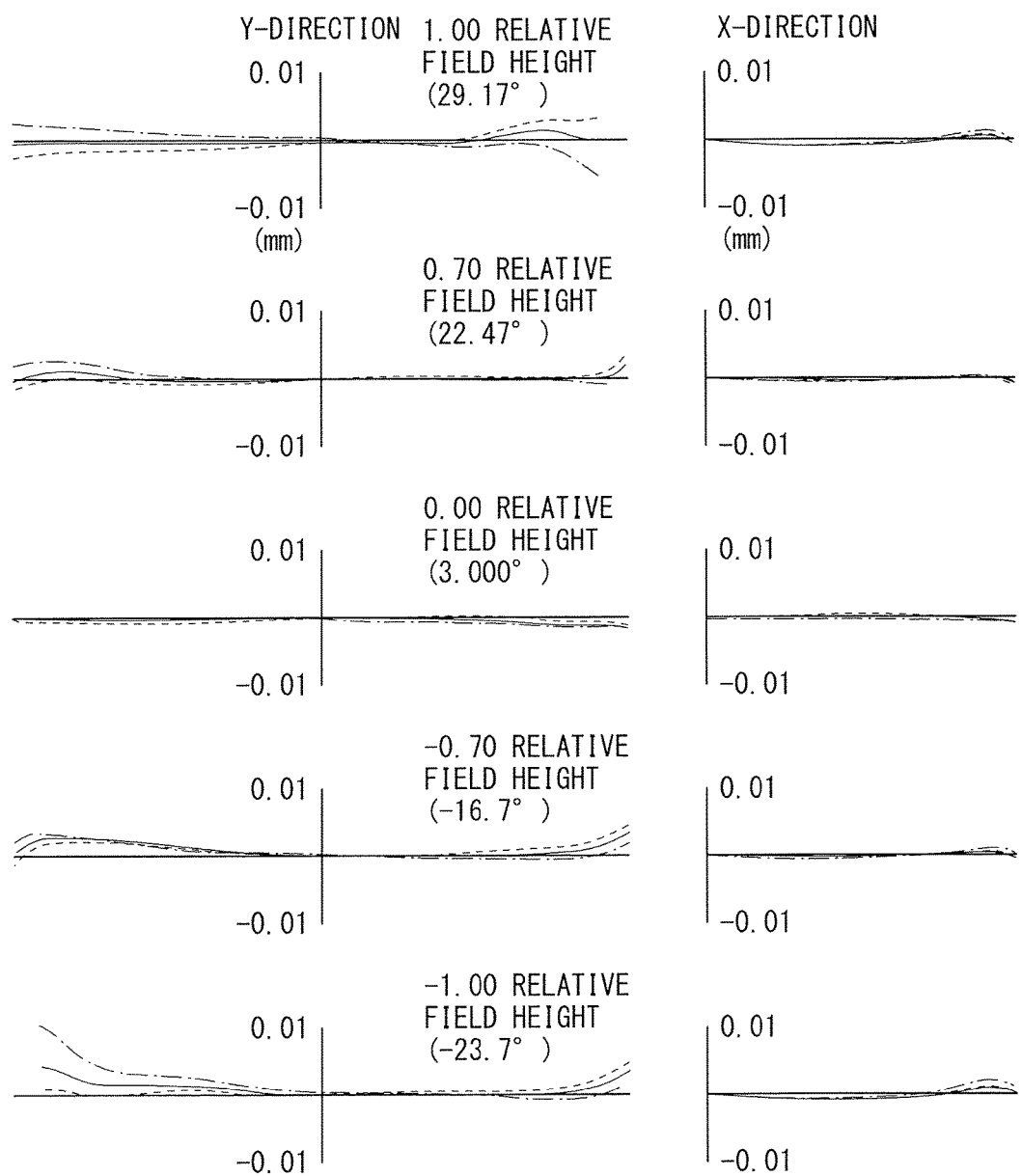

[FIG. 23]
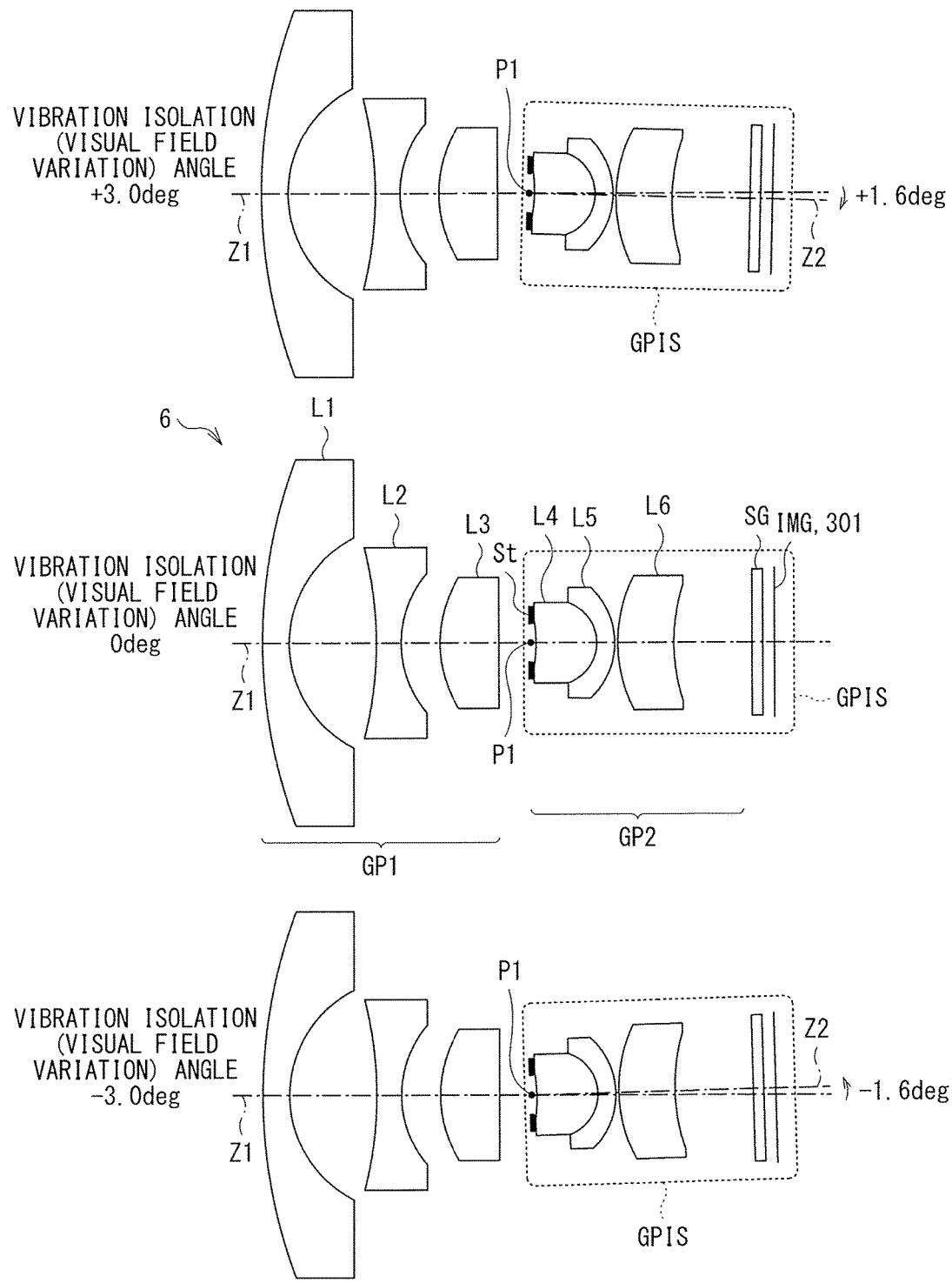

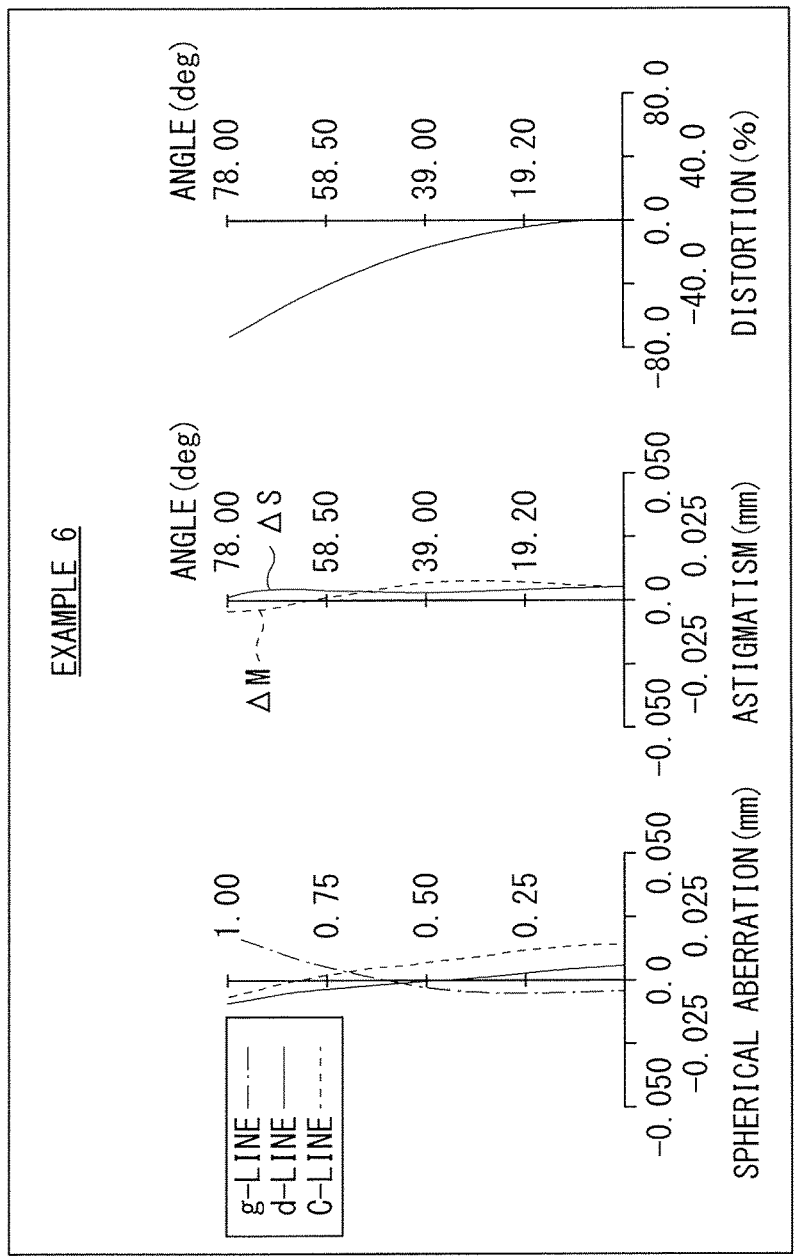
[FIG. 24]

[FIG. 25]
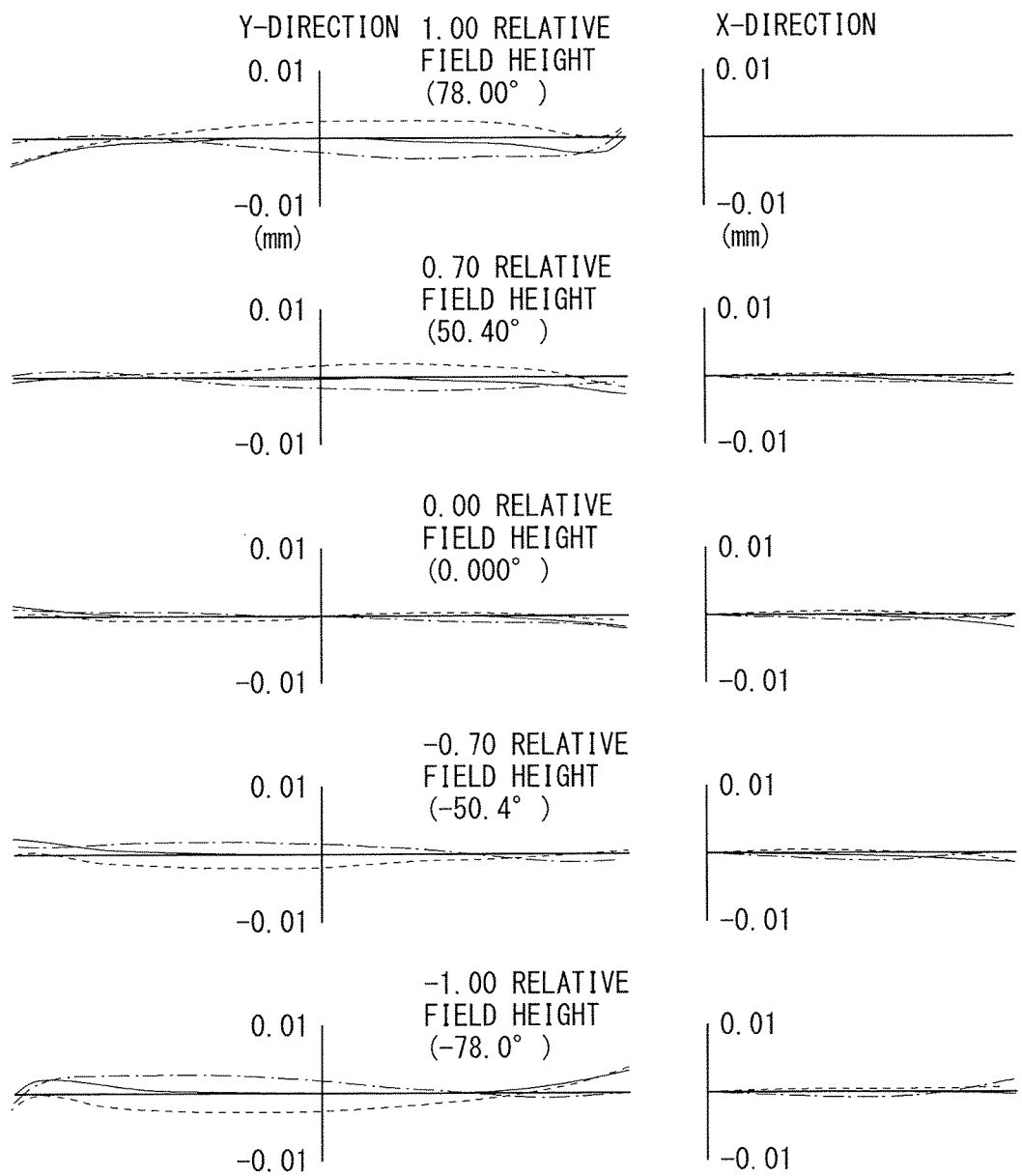

[ FIG. 26 ]
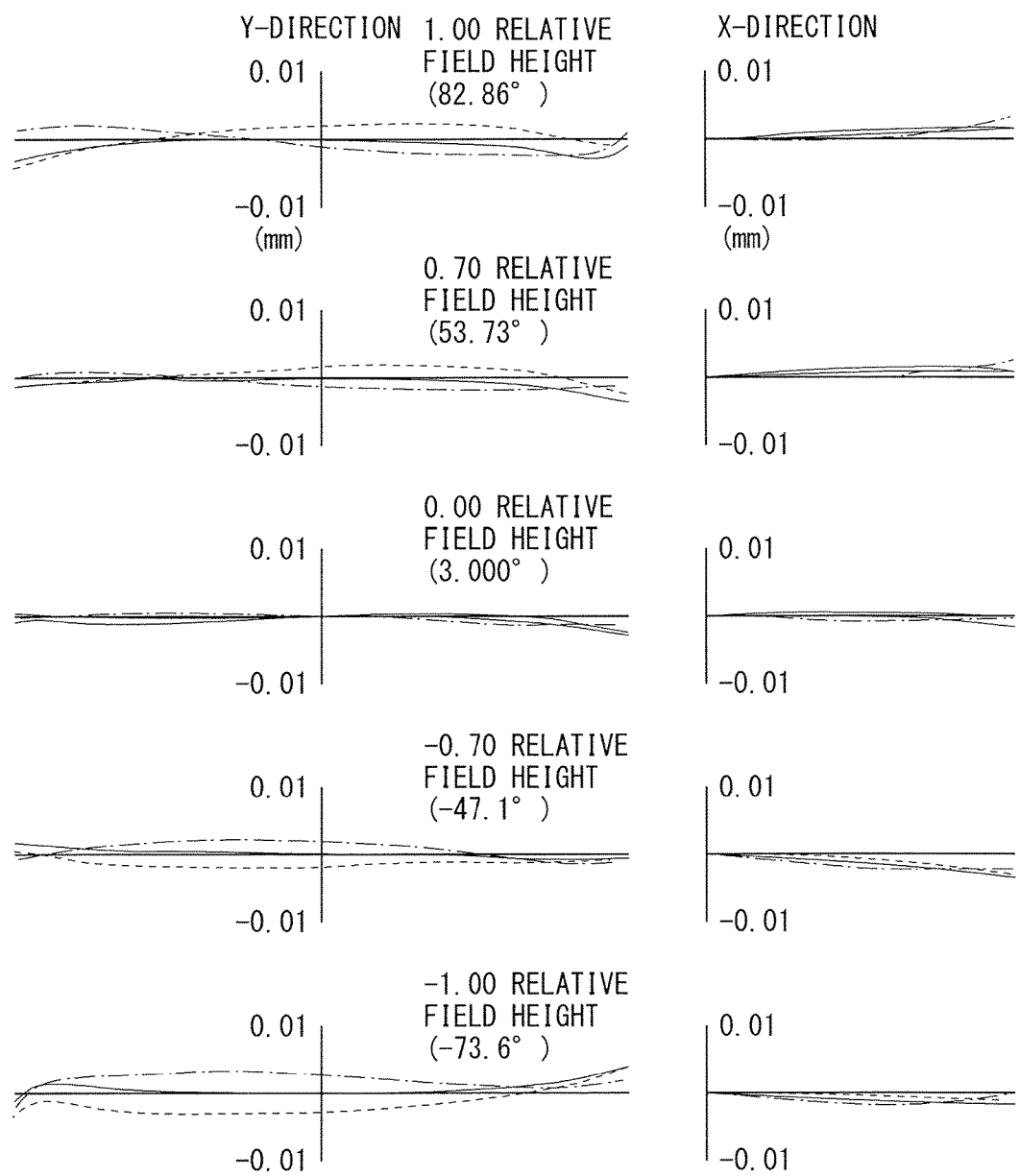

[ FIG. 27 ]
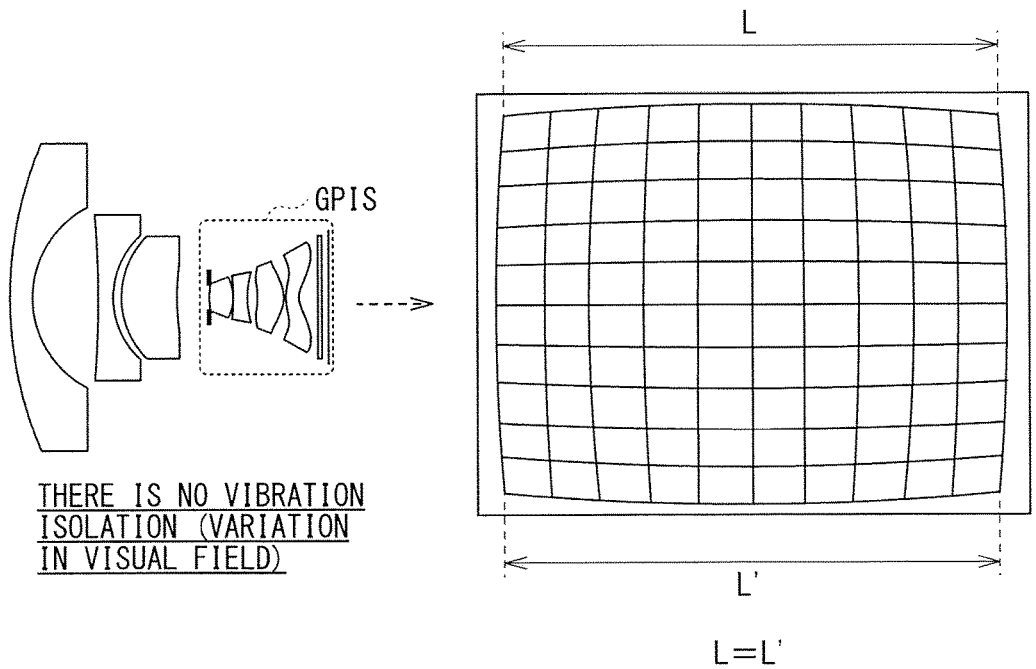
THERE IS NO VIBRATION
ISOLATION (VARIATION
IN VISUAL FIELD)
L=L'
[ FIG. 28 ]
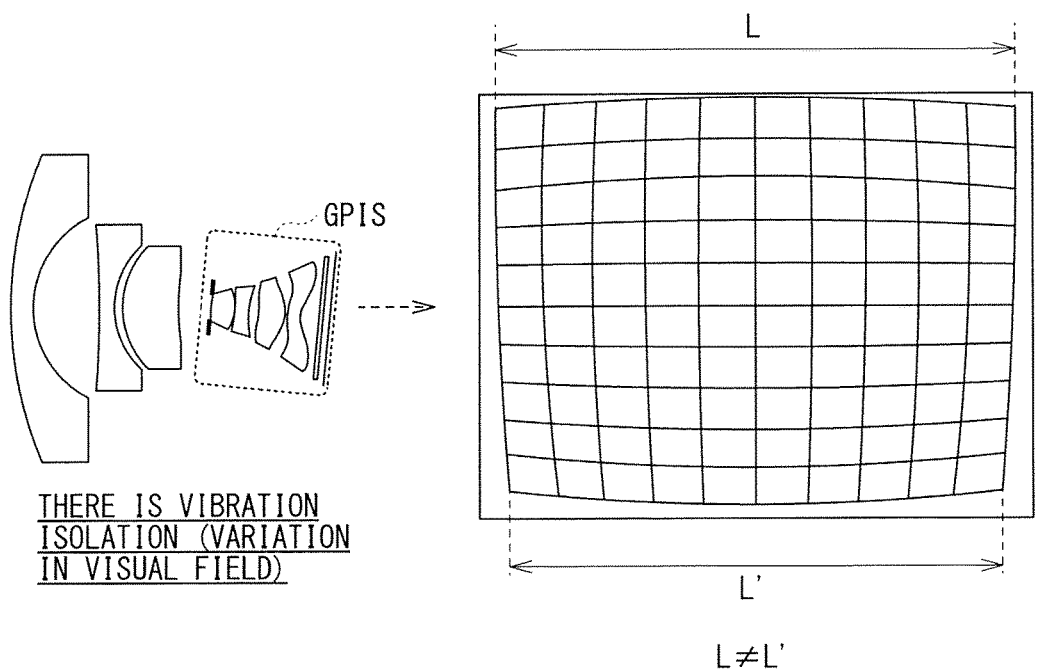
THERE IS VIBRATION
ISOLATION (VARIATION
IN VISUAL FIELD)
L≠L'

IMAGING UNIT AND IMAGING APPARATUS WITH ROTATABLE LENS GROUP FOR OPTICAL VIBRATION ISOLATION

CROSS REFERENCE TO RELATED APPLICATIONS

This application is a U.S. National Phase of International Patent Application No. PCT/JP2016/057728 filed on Mar. 11, 2016, which claims priority benefit of Japanese Patent Application No. JP 2015-083177 filed in the Japan Patent Office on Apr. 15, 2015. Each of the above-referenced applications is hereby incorporated herein by reference in its entirety.

TECHNICAL FIELD

The disclosure relates to an imaging unit and an imaging apparatus. More particularly, the disclosure relates to an imaging unit and an imaging apparatus each having a vibration isolation function and a function of varying a visual field. The imaging unit is suitably used for, for example, a digital video camera, a digital still camera, a smartphone equipped with a camera, an on-vehicle camera, and a medical endoscope camera, with use of a solid-state imaging device such as a charge coupled device (CCD) and a complementary metal oxide semiconductor (CMOS).

BACKGROUND ART

An imaging apparatus such as a digital video camera and a digital still camera with use of a solid-state imaging device such as a CCD and a CMOS has been known. Such an imaging apparatus has been requested to have a still smaller and thinner size and still less power consumption. Meanwhile, such an imaging apparatus has been requested to have an optical vibration isolation function that corrects blurring during photographing. Further, in recent years, an imaging apparatus in a category referred to as a wearable camera or an action cam has been prevalent. Such an imaging apparatus has been requested to have an ultra-wide angle, a smaller size, and less power consumption. Meanwhile, such an imaging apparatus has been requested to have an optical vibration isolation function with a large correction angle that is able to address severe blurring during photographing. As an imaging lens for such an imaging apparatus having the vibration isolation function, imaging lenses disclosed, for example, in PTL 1 and PTL 2 have been known.

CITATION LIST

Patent Literature

PTL 1: Japanese Unexamined Patent Application Publication No. H07-333561
PTL 2: Japanese Unexamined Patent Application Publication No. H08-220427

SUMMARY OF INVENTION

The above-described PTL 1 proposes providing a main lens system that forms an object image and a meniscus lens that is disposed between the main lens system and an image plane and has a concave surface toward the image plane; and correcting a tilt of the main lens system by rotationally moving the meniscus lens with respect to an optical axis.

Further, the above-described PTL 2 proposes providing, in order from object side, a first lens group having negative refractive power and a second lens group having positive refractive power; and correcting a tilt of an entire lens system by rotationally moving, as a correcting lens group, a portion of a part lens group having positive refractive power among the second lens group, with respect to an optical axis.

However, in the technique disclosed in the above-described PTL 1 has a large rotational angle of a correcting lens (meniscus lens) that corrects the tilt, and has a large lens system and a larger-sized imaging apparatus in order to avoid interference between the main lens system and the correcting lens, thus making it difficult to achieve reduction in size.

Moreover, the technique disclosed in the above-described PTL 2 ensures an image-forming performance upon the tilt correction, thus making it unable to have a larger rotational angle of the correcting lens group, which has made it difficult to achieve an optical vibration isolation function with a large correction angle that is requested from a wearable camera and an action cam.

Meanwhile, in order to achieve the optical vibration isolation function with a large correction angle, a vibration isolation method that corrects blurring by rotationally moving the entire lens system and an imaging device integrally has been put into practical use. In the case of the vibration isolation technique, the entire lens system and the imaging device are rotated integrally, thus causing a drive mechanism to have a larger size, which makes it difficult to achieve a smaller size of the imaging apparatus. Further, large driving force is necessary to integrally move the entire lens system and the imaging device that are heavy, which results in large power consumption of an actuator that performs the driving.

It is therefore desirable to provide an imaging unit and an imaging apparatus that make it possible to achieve an optical vibration isolation function with a large correction angle or a visual field-varying function with a large variation angle, while accomplishing a smaller size and less power consumption.

An imaging unit according to an embodiment of the disclosure includes an imaging lens including a first lens group and a second lens group that are disposed in order from object side toward image side, and an imaging device that converts an optical image formed by the imaging lens into an electric signal. The second lens group and the imaging device are rotationally moved integrally to allow the second lens group and the imaging device to be tilted with respect to an optical axis of the first lens group.

An imaging apparatus according to an embodiment of the disclosure includes an imaging lens including a first lens group and a second lens group that are disposed in order from object side toward image side, an imaging device that converts an optical image formed by the imaging lens into an electric signal, and an arithmetic unit that corrects an image captured by the imaging device. The second lens group and the imaging device are rotationally moved integrally to allow the second lens group and the imaging device to be tilted with respect to an optical axis of the first lens group.

In the imaging unit or the imaging apparatus according to the embodiment of the disclosure, the second lens group and the imaging device are rotationally moved integrally to allow the second lens group and the imaging device to be tilted with respect to the optical axis of the first lens group.

According to the imaging unit or the imaging apparatus of the embodiment of the disclosure, only the second lens group, among the first lens group and the second lens group, is rotationally moved integrally with the imaging device, thus making it possible to achieve the optical vibration isolation function with a large correction angle or the visual field-varying function with a large variation angle, while accomplishing a smaller size and less power consumption.

It is to be noted that effects of the disclosure are not necessarily limited to the effects described above, and may include any of effects that are described herein.

BRIEF DESCRIPTION OF DRAWINGS

FIG. 1 is a configuration diagram illustrating an example of an imaging unit according to an embodiment of the disclosure.

FIG. 2 is a configuration diagram illustrating an example of an imaging apparatus according to an embodiment.

FIG. 3 is a lens cross-sectional diagram illustrating a first configuration example of an imaging lens to be applied to the imaging unit.

FIG. 4 is an aberration diagram illustrating various types of aberrations in Numerical Example 1 in which specific numerical values are applied to the imaging lens illustrated in FIG. 3.

FIG. 5 is an aberration diagram illustrating lateral aberrations in Numerical Example 1.

FIG. 6 is an aberration diagram illustrating lateral aberrations during vibration isolation or during variation in a visual field in Numerical Example 1.

FIG. 7 is a lens cross-sectional diagram illustrating a second configuration example of the imaging lens to be applied to the imaging unit.

FIG. 8 is an aberration diagram illustrating various types of aberrations in Numerical Example 2 in which specific numerical values are applied to the imaging lens illustrated in FIG. 7.

FIG. 9 is an aberration diagram illustrating lateral aberrations in Numerical Example 2.

FIG. 10 is an aberration diagram illustrating lateral aberrations during vibration isolation or during variation in a visual field in Numerical Example 2.

FIG. 11 is a lens cross-sectional diagram illustrating a third configuration example of the imaging lens to be applied to the imaging unit.

FIG. 12 is an aberration diagram illustrating various types of aberrations in Numerical Example 3 in which specific numerical values are applied to the imaging lens illustrated in FIG. 11.

FIG. 13 is an aberration diagram illustrating lateral aberrations in Numerical Example 3.

FIG. 14 is an aberration diagram illustrating lateral aberrations during vibration isolation or during variation in a visual field in Numerical Example 3.

FIG. 15 is a lens cross-sectional diagram illustrating a fourth configuration example of the imaging lens to be applied to the imaging unit.

FIG. 16 is an aberration diagram illustrating various types of aberrations in Numerical Example 4 in which specific numerical values are applied to the imaging lens illustrated in FIG. 15.

FIG. 17 is an aberration diagram illustrating lateral aberrations in Numerical Example 4.

FIG. 18 is an aberration diagram illustrating lateral aberrations during vibration isolation or during variation in a visual field in Numerical Example 4.

FIG. 19 is a lens cross-sectional diagram illustrating a fifth configuration example of the imaging lens to be applied to the imaging unit.

FIG. 20 is an aberration diagram illustrating various types of aberrations in Numerical Example 5 in which specific numerical values are applied to the imaging lens illustrated in FIG. 19.

FIG. 21 is an aberration diagram illustrating lateral aberrations in Numerical Example 5.

FIG. 22 is an aberration diagram illustrating lateral aberrations during vibration isolation or during variation in a visual field in Numerical Example 5.

FIG. 23 is a lens cross-sectional diagram illustrating a sixth configuration example of the imaging lens to be applied to the imaging unit.

FIG. 24 is an aberration diagram illustrating various types of aberrations in Numerical Example 6 in which specific numerical values are applied to the imaging lens illustrated in FIG. 23.

FIG. 25 is an aberration diagram illustrating lateral aberrations in Numerical Example 6.

FIG. 26 is an aberration diagram illustrating lateral aberrations during vibration isolation or during variation in a visual field in Numerical Example 6.

FIG. 27 schematically describes distortion caused by the imaging lens.

FIG. 28 schematically describes distortion caused by the imaging lens during vibration isolation.

MODES FOR CARRYING OUT THE INVENTION

Some embodiments of the disclosure are described in detail below with reference to drawings. It is to be noted that the description is given in the following order.
1. Basic Configurations of Imaging Unit and Imaging Apparatus
2. Workings and Effects
3. Numerical Examples of Imaging Lens to be Applied to Imaging Unit
4. Other Embodiments

1. Basic Configurations of Imaging Unit and Imaging Apparatus

FIG. 1 illustrates a configuration example of an imaging unit 400 according to an embodiment of the disclosure. FIG. 2 illustrates a configuration example of an imaging apparatus 401 according to an embodiment of the disclosure.

As illustrated in FIG. 1, the imaging unit 400 according to the present embodiment includes an imaging lens 300, and an imaging device 301 that converts an optical image formed by the imaging lens 300 into an electric signal. As illustrated in FIG. 2, the imaging apparatus 401 according to the present embodiment includes the imaging unit 400, and an arithmetic unit 302 that corrects an image captured by the imaging device 301.

The arithmetic unit 302 includes an image obtaining section 303, an aberration correction amount calculating section 304, and an aberration correcting section 305. The image obtaining section 303 obtains, as image data, an electric signal converted by the imaging device 301. The aberration correction amount calculating section 304 calculates an aberration correction amount of an image on the basis of the data obtained by the image obtaining section 303. The aberration correcting section 305 corrects an aberration of the image on the basis of the aberration correction amount calculated by the aberration correction amount calculating section 304.

The imaging lens 300 includes a first lens group GP1 and a second lens group GP2 that are disposed in order from object side toward image side. The imaging lens 300 may further include an aperture stop St disposed between the first lens group GP1 and the second lens group GP2. The aperture stop St may be disposed near a surface of a lens, of the second lens group GP2, that is closest to the object side.

FIGS. 3, 7, 11, 15, 19, and 23 illustrate, respectively, first to sixth configuration examples of the imaging lens 300. Numerical examples in which specific numerical values are applied to the respective first to sixth configuration examples are described later.

An optical member such as a seal glass SG for protection of the imaging device and various optical filters may be provided between the imaging lens 300 and an image plane IMG.

In each of the configuration examples of diagrams such as FIG. 3, Z1 denotes an optical axis of the first lens group GP1. Z2 denotes an optical axis of the second lens group GP2. As illustrated in each of the configuration examples of diagrams such as FIG. 3, in the imaging unit 400, the second lens group GP2 and the imaging device 301 are rotationally moved integrally to allow the second lens group GP2 and the imaging device 301 to be tilted with respect to the optical axis Z1 of the first lens group GP1. The imaging unit 400 causes the second lens group GP2 and the imaging device 301 to rotationally move integrally as a blurring correcting group GPIS to thereby perform a blurring correction of a photographed image. Further, the imaging unit 400 may cause the second lens group GP2 and the imaging device 301 to rotationally move integrally, with the blurring correcting group GPIS as a visual field-varying group to thereby vary a visual field.

It is to be noted that, in FIGS. 3, 7, 11, 15, 19, and 23, the middle section illustrates a state where a vibration isolation angle (blurring correction angle) or a visual field variation angle is 0 (deg). In the state of the middle section, the optical axis Z1 of the first lens group GP1 and the optical axis Z2 of the second lens group GP2 are substantially coincident with each other to be collinear. The upper section and the lower section each illustrate a state where the blurring correcting group GPIS is rotationally moved for vibration isolation or a state where a visual field is varied. In the state of the upper section, the blurring correcting group GPIS is rotationally moved to be tilted in a clockwise direction (in a downward direction) in the diagram with respect to the optical axis Z1 of the first lens group GP1. In the state of the lower section, the blurring correcting group GPIS is rotationally moved to be tilted in a counterclockwise direction (in an upward direction) in the diagram with respect to the optical axis Z1 of the first lens group GP1. It is to be noted that each of the configuration examples of diagrams such as FIG. 3 illustrates an example in which the blurring correcting group GPIS is rotationally moved on a sheet surface; however, the blurring correcting group GPIS may be rotationally moved in a direction different from that illustrated on the sheet surface.

Aside from those described above, it is desirable that the imaging unit 400 and the imaging apparatus 401 as well as the imaging lens 300 according to the present embodiment satisfy factors such as predetermined conditional expressions described later.

2. Working and Effects

Description is given next of workings and effects of each of the imaging unit 400 and the imaging apparatus 401 according to the present embodiment. In addition, description is given of a desirable configuration of each of the imaging unit 400 and the imaging apparatus 401 according to the present embodiment.

It is to be noted that the effects described herein are mere examples, and are not limitative; the disclosure may further include other effects.

The imaging unit 400 and the imaging apparatus 401 according to the present embodiment each have a configuration in which only the second lens group GP2, among the first lens group GP1 and the second lens group GP2 in the imaging lens 300, is rotationally moved integrally with the imaging device 301. Only the small-sized and light-weighted second lens group GP2, among the first lens group GP1 and the second lens group GP2, is rotationally moved integrally with the imaging device 301. Therefore, it becomes possible to reduce the size of each of the imaging unit 400 and the imaging apparatus 401 and thus to suppress power consumption necessary for driving thereof as well as to perform a blurring correction of a photographed image or varying a visual field. This makes it possible to achieve an optical vibration isolation function with a large correction angle, or to achieve a visual field-varying function with a large variation angle.

Further, in the imaging unit 400 and the imaging apparatus 401 according to the present embodiment, the first lens group GP1 is desirably fixed when performing the blurring correction of the photographed image or when varying the visual field. In many cases, the first lens group GP1 that configures a lens system is configured by a lens having a large outer diameter due to its configuration. In particular, in a wide-angle lens system having a field angle of more than 100 degrees, the first lens group GP1 not only has a larger size, but also has a significantly heavy weight. Thus, it becomes necessary to have a large drive mechanism and large power consumption in order to drive such a lens group. Accordingly, fixing the first lens group GP1 enables the imaging apparatus 401 to have a smaller size and to consume less power.

Moreover, fixing the first lens group GP1 makes it easy to allow a periphery of a lens, of the imaging lens 300, that is closest to the object side to have a sealed structure with respect to a housing. Thus, it becomes possible to provide a water-proof performance and a dust-proof performance that are highly requested in some wearable cameras or action cams.

As described above, it is desirable that the outer diameter of the entire first lens group GP1 is larger than the outer diameter of the entire second lens group GP2, and that the first lens group GP1 include a glass lens on side closest to the object side. In general, the glass lens is heavier than a plastic lens, and thus the glass lens is desirably disposed inside the first lens group GP1 that is a fixed group. Further, the second lens group GP2 is a moving group, and thus the second lens group GP2 desirably has an outer diameter that is smaller than that of the first lens group GP1.

Further, as illustrated in each of the configuration examples of diagrams such as FIG. 3, in the imaging unit 400 and the imaging apparatus 401 according to the present embodiment, a rotational movement center P1 during the integral rotational movement of the second lens group GP2 and the imaging device 301 is desirably a point on the optical axis of the first lens group GP1 near a position where the aperture stop St is disposed. This allows the rotational movement center P1 to be a point near an entrance pupil. In this case, it is desirable that the aperture stop St be also rotationally moved integrally with the second lens group GP2 and the imaging device 301.

The integral rotational movement of the second lens group GP2 and the imaging device 301 around the point near the entrance pupil of the imaging lens 300 makes it possible to suppress unnecessary variation in a visual field when performing the blurring correction or varying the visual field. In a case where the second lens group GP2 and the imaging device 301 are rotationally moved integrally around a point largely different from the positon of the entrance pupil, a shift component occurs in a direction perpendicular to the optical axis Z1 due to the rotational movement, thus causing variation in the visual field to occur. It is also possible to correct, by an arithmetic unit 302, the variation in the visual field that has occurred. However, in order to simplify the correction by the arithmetic unit 302 and to ensure a blurring correction amount or a variation amount in the visual field as large as possible with the rotational movement, the second lens group GP2 and the imaging device 301 are desirably rotationally moved integrally around the point near the optical axis where the aperture stop St is disposed, so as not to allow such a shift component to occur.

Further, the aperture stop St is desirably disposed between the first lens group GP1 and the second lens group GP2, in particular, near the surface of the lens, of the second lens group GP2, that is closest to the object side. This makes it possible to dispose the entrance pupil of the imaging lens 300 closer to the object side. As a result, it becomes possible to suppress the size of the outer diameter of each of lenses configuring the first lens group GP1, thus enabling a smaller size of the entire imaging apparatus 401 to be achieved.

Furthermore, the imaging apparatus 401 according to the present embodiment desirably includes the arithmetic unit 302 that corrects an image captured by the imaging device 301. This makes it possible to correct, by the arithmetic unit 302, a photographed image having asymmetric distortion with respect to a central axis of an imaging plane of the imaging device 301. The photographed image is generated by rotationally moving the second lens group GP2 and the imaging device 301 integrally. It is to be noted that not only the asymmetric distortion component, but also a symmetric distortion component as well as other residual aberrations may also be corrected by the arithmetic unit 302. This makes it possible to obtain a high-quality image at a region from a center toward a periphery of the image surface.

In a wide-angle lens of a wide-angle system having a relatively wide field angle and having a negative distortion as well as in a telephoto lens of a telephoto system having a relatively narrow field angle and having a positive distortion, the asymmetric distortion component with respect to the central axis of the imaging plane occurs when performing the blurring correction or varying the visual field. In a case where blurring occurs during photographing a motion picture, the asymmetric distortion component appears as a fluctuation of an image at the periphery of the image surface, thus causing an image quality of the obtained image to be largely impaired.

Here, FIG. 27 schematically illustrates distortion caused by the imaging lens 300 in a state where there is no vibration isolation (variation in a visual field). Further, FIG. 28 schematically illustrates distortion caused by the imaging lens 300 during the vibration isolation (variation in the visual field). It is to be noted that FIG. 28 schematically illustrates the distortion in a case where the blurring correcting group GPIS is rotationally moved to be tilted in the clockwise direction (in the downward direction) in the diagram. As illustrated in FIG. 27, in the state where no vibration isolation is performed, a substantially symmetric distortion with respect to the central axis of the imaging plane occurs, thus allowing widths of an upper side and a lower side of an image to be substantially the same length L. In contrast, as illustrated in FIG. 28, during the vibration isolation, an asymmetric distortion with respect to the central axis of the imaging plane occurs in a vertical direction that is a direction of the rotational movement, thus allowing the widths of the upper side and the lower side of the image to be, respectively, the length L and a length L' which are different from each other. By correcting such a symmetric distortion or such an asymmetric distortion by the arithmetic unit 302, it becomes possible to obtain a high-quality image at a region toward the periphery of the image surface.

Further, in the imaging unit 400 and the imaging apparatus 401 according to the present embodiment, the imaging lens 300 desirably satisfies the following conditional expressions:

$$f/f1 < 0.10 \tag{1}$$

$$f/f2 < 1.40 \tag{2}$$

where f denotes a focal distance of an entire system of the imaging lens 300, f1 denotes a focal distance of the first lens group GP1, and f2 denotes a focal distance of the second lens group GP2.

The conditional expression (1) defines a ratio of the focal distance of the entire lens system to the focal distance of the first lens group GP1. When this conditional expression is not satisfied, positive refractive power of the first lens group GP1 becomes too strong, which increases an aberration during the rotation correction, thus making it difficult to ensure a necessary image-forming performance.

The conditional expression (2) defines a ratio of the focal distance of the entire lens system to the focal distance of the second lens group GP2. When this conditional expression is not satisfied, a rotational angle of the second lens group GP2 and the imaging device 301 becomes large when performing the blurring correction of a photographed image or varying a visual field, which is unsuitable for having a smaller size of the imaging apparatus 401.

Further, in the present embodiment, the imaging unit 400 and the imaging apparatus 401 are desirably configured to perform focusing on an object having a varied subject distance by allowing the second lens group GP2 to move in an optical axis direction of the second lens group GP2. By adopting this configuration, it becomes possible to focus on a photographing target having a varied subject distance, while achieving the blurring correction and the variation in the visual field, thus allowing for achievement of a high-resolution photographed image. In addition, a variation in an image-forming position is also envisaged due to a change in an environmental temperature when using the imaging apparatus 401. However, by adopting the present configuration, it becomes possible to address the variation in the image-forming position during the change in the temperature as well.

Furthermore, in the present embodiment, the imaging unit 400 and the imaging apparatus 401 are desirably configured to allow a surface of the lens, of the second lens group GP2, that is closest to the image side to have a concave shape toward the image side near the optical axis and to have a convex shape toward the image side near a peripheral part. By adopting this configuration, it becomes possible to optimize a main beam incident angle on the imaging device 301 on the periphery of the image surface so as not to be extremely large, while reducing an exit pupil distance of the imaging lens 300, thus achieving a lens configuration with a short back focus. This allows an integrated drive unit of the second lens group GP2 and the imaging device 301 to have a smaller size, which also allows the drive mechanism to have a smaller size when performing the blurring correction or varying the visual field, thus achieving a smaller size of the imaging apparatus 401. Further, the smaller-sized integrated drive unit of the second lens group GP2 and the imaging device 301 allows for a lighter weight of the drive unit, thus enabling power consumption to be suppressed.

Moreover, in the present embodiment, the imaging unit 400 and the imaging apparatus 401 are desirably configured to allow at least a lens, configuring the second lens group GP2, that is closest to the image side to be a plastic lens. By allowing the surface of the lens, configuring the second lens group GP2, that is closest to the image side to have the concave shape toward the image side near the optical axis and to have the convex shape toward the image side near the peripheral part, it becomes possible to allow the imaging apparatus 401 to have a smaller size and to consume less power. In order to achieve such a lens shape with high precision, it is desirable to adopt plastic as a lens material. This enables the high-resolution photographed image to be obtained.

It is to be noted that the imaging unit 400 and the imaging apparatus 401 according to the present embodiment desirably satisfy the above-described conditional expressions (1) and (2), and, in addition, desirably satisfy the following conditional expressions.

$$f/f1 < -0.10 \qquad (1)'$$

$$f/f2 < 0.70 \qquad (2)'$$

Satisfying the conditional expression (1)' makes it possible to properly suppress the aberration variation during the rotational movement of the blurring correcting group GPIS, thus ensuring a large blurring correction angle and a large visual field variation angle.

Meanwhile, satisfying the conditional expression (2)' makes it possible to ensure a relatively large blurring correction angle and a relatively large visual field variation angle, while enabling the imaging apparatus 401 to have a smaller size.

Therefore, a wide-angle lens having a short focal distance in the entire lens system is suitable as the imaging lens 300 that configures the imaging unit 400 according to the present embodiment.

As for a configuration in a case where the imaging lens 300 is adopted as the wide-angle lens, as in the imaging lens 1 illustrated in FIG. 3, for example, the first lens group GP1 is desirably configured by, in order from the object side toward the image side, a first lens L1 in a meniscus shape having negative refractive power and having a convex surface toward the object side, a second lens L2 having negative refractive power, and a third lens L3 having positive refractive power.

Adopting this configuration makes it possible to achieve the wide-angle lens having a short focal distance in the entire lens system.

Further, as in the imaging lens 1 illustrated in FIG. 3, for example, the second lens group GP2 is desirably configured by, in order from the object side toward the image side, a fourth lens L4 having positive refractive power, a fifth lens L5 having negative refractive power, a sixth lens L6 having positive refractive power, and a seventh lens L7 having negative refractive power near the optical axis and having a lens surface on the image side in a concave shape toward the image side near the optical axis and in a convex shape toward the image side near the peripheral part.

Adopting this configuration makes it possible to reduce the total length of the imaging lens 300, while correcting the aberration that occurs in the second lens group GP2 in a well-balanced manner, thus enabling the imaging apparatus 401 to have a smaller size. Further, by configuring a portion or all of lenses configuring the second lens group GP2 using a plastic lens, it becomes possible to reduce the weight of the second lens group GP2 that is driven when performing the blurring correction or varying the visual field, thus also enabling the power consumption during the driving to be suppressed.

It is to be noted that the imaging apparatus 401 according to the present embodiment is in a best mode when used for, for example, a digital video camera, a digital still camera, and a smartphone equipped with a camera which have a smaller size, less power consumption, and an optical vibration isolation function with a large correction angle; however, the present technology is not limited to the use application of the vibration isolation. An on-vehicle camera, a surveillance camera, and a medical endoscope camera, for example, with use of the imaging device 301 similarly to that in the imaging apparatus 401 are requested to have the function of varying a visual field in order to capture a subject more precisely, while these cameras are requested to have a still smaller size. The imaging apparatus 401 according to the present embodiment may have a suitable configuration also in the request for such a function of varying the visual field.

EXAMPLES

3. Numerical Examples of Imaging Lens to be Applied to Imaging Unit

Description is given next of specific numerical examples of the imaging lens 300 according to the present embodiment. Description is given here of numerical examples in which specific numerical values are applied to imaging lenses 1 to 6 of configuration examples illustrated, respectively, in FIGS. 3, 7, 11, 15, 19, and 23.

It is to be noted that symbols in the following tables and the description below denote the following meanings. "GPi" denotes i-th lens group when the lens group is counted from the object side toward the image side. "Si" denotes the number of i-th surface when the surface is counted from the object side toward the image side. "Ri" denotes a value (mm) of a paraxial radius of curvature of the i-th surface Si. "di" denotes a value (mm) of a spacing on the optical axis between the i-th surface and (i+1)th surface. "ni" denotes a value of a refractive index of a d-line (having a wavelength of 587.6 nm) of a lens or an optical member having the i-th surface S1. "vi" denotes a value of an Abbe number of the d-line of the lens or the optical member having the i-th surface S1. A surface referred to as "STO" in "Ri" denotes the aperture stop St. "f" denotes a focal distance of the entire lens system, "F" denotes an F-number, and "2ω" denotes an entire field angle in a diagonal direction.

Some of the lenses used in the respective numerical examples include an aspheric lens surface. A surface referred to as "ASP" in each of tables denotes an aspheric surface. The shape of the aspheric surface is defined by the following expression of the aspheric surface. It is to be noted that, in each of the tables indicating aspheric surface coefficients described later, "E-i" denotes an exponential expression having 10 as a base, i.e., "E-i" denotes "$10^{-i}$". For example, "0.12345E-05" denotes "$0.12345 \times 10^{-5}$".

$$Z = \frac{Y^2/R}{1+\sqrt{1-(1+K)(Y/R)^2}} + \sum_{i=3}^{n} AiY^i$$

In the foregoing expression, Z denotes a depth of the aspheric surface, and Y denotes a height from the optical axis. R denotes a paraxial radius of curvature, K denotes a conic constant, and A3 to Ai denote, respectively, a third to i-th order aspheric surface coefficient.

[Configuration Common to Numerical Examples]

Each of the imaging lenses 1 to 6 to which the respective numerical examples described below are applied is applicable as the above-described imaging lens 300 in the imaging unit 400 and the imaging apparatus 401, and has a configuration that satisfies the above-described basic configurations of the imaging unit 400 and the imaging apparatus 401. In other words, the imaging lenses 1 to 6 each include the first lens group GP1 and the second lens group GP2 that are disposed in order from the object side toward the image side. The aperture stop St is disposed between the first lens group GP1 and the second lens group GP2, near a surface of the lens, of the second lens group GP2, that is closest to the object side. The seal glass SG that protects an imaging device is provided between the imaging lens 300 and the image plane IMG. The second lens group GP2 and the aperture stop St are rotationally moved integrally with the imaging device 301. The rotational movement center P1 during the integral rotational movement is a point on the optical axis near a position where the aperture stop St is disposed.

Numerical Example 1

Table 1 describes lens data of Numerical Example 1 in which specific numerical values are applied to the imaging lens 1 illustrated in FIG. 3.

In the imaging lens 1 illustrated in FIG. 3, the first lens group GP1 is configured by, in order from the object side toward the image side, the first lens L1 in a meniscus shape having negative refractive power and having a convex surface toward the object side, the second lens L2 having negative refractive power, and the third lens L3 having positive refractive power.

The second lens group GP2 is configured by, in order from the object side toward the image side, the fourth lens L4 having positive refractive power, the fifth lens L5 having negative refractive power, the sixth lens L6 having positive refractive power, and the seventh lens L7 having negative refractive power near the optical axis and having a lens surface on the image side in a concave shape toward the image side near the optical axis and in a convex shape toward the image side near the peripheral part.

In the imaging lens 1, an aspheric surface is formed on both faces of each lens of the third lens L3 to the seventh lens L7. Table 2 describes values of aspheric surface coefficients A3 to A16 in each of the aspheric surfaces, together with values of the conic constant K.

Further, values of each of the F number, the focal distance f of the entire lens system, and the entire field angle 2ω in the diagonal direction are described as follows.

$F$=2.86

$f$=1.455

$2\omega$=150.6°

TABLE 1

| | | | Example 1 | | | |
|---|---|---|---|---|---|---|
| GPi | Si | Ri | Aspheric Surface | di | ni | vi |
| GP1 | 1 | 13.648 | | 0.80 | 1.835 | 42.7 |
| | 2 | 3.507 | | 2.33 | | |
| | 3 | −31.933 | | 0.50 | 1.497 | 81.6 |
| | 4 | 2.927 | | 0.29 | | |
| | 5 | 3.165 | ASP | 1.97 | 1.689 | 31.2 |
| | 6 | 14.997 | ASP | 1.14 | | |
| | 7 | STO | | 0 | | |
| GP2 | 8 | 2.127 | ASP | 0.83 | 1.544 | 56.1 |
| | 9 | −1.476 | ASP | 0.02 | | |
| | 10 | −6.378 | ASP | 0.50 | 1.650 | 21.5 |
| | 11 | 2.441 | ASP | 0.33 | | |
| | 12 | −10.414 | ASP | 0.95 | 1.535 | 56.3 |
| | 13 | −1.165 | ASP | 0.10 | | |
| | 14 | 1.552 | ASP | 0.45 | 1.535 | 56.3 |
| | 15 | 0.745 | ASP | 0.67 | | |
| | 16 | ∞ | | 0.11 | 1.517 | 64.2 |
| | 17 | ∞ | | 0.30 | | |
| | 18 | IMG | | | | |

TABLE 2

| | | Example 1 | | | |
|---|---|---|---|---|---|
| Si | K | A3 | A4 | A5 | A6 |
| 5 | 0 | 0 | 2.878E−03 | 0 | 7.185E−05 |
| 6 | −24.8411 | 0 | 4.961E−03 | 0 | −1.166E−03 |
| 8 | −1.0839 | 0 | −4.829E−02 | 0 | −1.067E−01 |
| 9 | 1.5305 | 0 | 8.221E−02 | 0 | 8.910E−02 |
| 10 | 10.0000 | −1.482E−02 | −6.002E−02 | −1.860E−02 | 8.710E−02 |
| 11 | −9.9966 | −5.422E−03 | −2.788E−02 | 6.730E−02 | −1.246E−02 |
| 12 | −10.0000 | 3.019E−03 | 1.065E−01 | −9.527E−02 | 2.360E−02 |
| 13 | −3.4641 | −3.897E−02 | −1.921E−02 | 7.171E−02 | −9.025E−02 |
| 14 | −4.4881 | −7.637E−02 | −1.761E−01 | 5.379E−02 | 1.298E−02 |
| 15 | −3.2567 | 1.954E−02 | −2.529E−01 | 1.743E−01 | −2.144E−02 |

| Si | A7 | A8 | A9 | A10 | A11 |
|---|---|---|---|---|---|
| 5 | 0 | 2.576E−06 | 0 | 3.777E−06 | 0 |
| 6 | 0 | 3.946E−04 | 0 | −5.346E−05 | 0 |

TABLE 2-continued

| | | Example 1 | | | |
|---|---|---|---|---|---|
| 8 | 0 | 1.591E−01 | 0 | −4.095E−01 | 0 |
| 9 | 0 | −7.628E−02 | 0 | 9.559EE−02 | 0 |
| 10 | 1.046E−01 | 1.414E−02 | −1.381E−01 | 4.681E−02 | 0 |
| 11 | −2.752E−02 | 2.742E−02 | 4.527E−02 | −2.671E−02 | 0 |
| 12 | 2.420E−02 | 7.767E−03 | −3.153E−02 | 1.620E−02 | 0 |
| 13 | 4.317E−02 | 1.567E−02 | 1.379E−02 | −1.293E−02 | 0 |
| 14 | 1.313E−02 | −3.983E−03 | −4.396E−03 | 7.844E−04 | 4.440E−04 |
| 15 | −1.730E−02 | 3.564E−03 | 5.359E−04 | 3.411E−05 | 6.462E−05 |

| Si | A12 | A13 | A14 | A15 | A16 |
|---|---|---|---|---|---|
| 5 | 0 | 0 | 0 | 0 | 0 |
| 6 | 0 | 0 | 0 | 0 | 0 |
| 8 | 5.277E−03 | 0 | 1.129E−03 | 0 | 0 |
| 9 | −1.819E−02 | 0 | 6.589E−03 | 0 | 1.871E−02 |
| 10 | 0 | 0 | 0 | 0 | 0 |
| 11 | 0 | 0 | 0 | 0 | 0 |
| 12 | 0 | 0 | 0 | 0 | 0 |
| 13 | 0 | 0 | 0 | 0 | 0 |
| 14 | −2.248E−04 | 0 | 0 | 0 | 0 |
| 15 | −6.600E−05 | 0 | 0 | 0 | 0 |

FIG. 4 illustrates various types of aberrations in Numerical Example 1. FIG. 4 illustrates, as the various types of aberrations, spherical aberration, astigmatism (field curvature), and distortion. In the astigmatism diagram, a solid line ($\Delta$S) indicates a value in a sagittal image plane, and a dashed line ($\Delta$M) indicates a value in a meridional image plane. The aberration diagrams of the spherical aberration indicate values in the d-line, C-line (656.3 nm), and g-line (435.8 nm). The same holds true also for aberration diagrams in other numerical examples described hereinafter.

Further, FIGS. 5 and 6 each illustrate lateral aberrations in Numerical Example 1. FIG. 5 illustrates lateral aberrations in a state where the vibration isolation angle (blurring correction angle) or the visual field variation angle is 0 (deg). FIG. 6 illustrates lateral aberrations in a state during the vibration isolation or during the variation in the visual field.

As appreciated from the respective aberration diagrams, the respective aberrations are favorably corrected in the imaging lens 1 according to Numerical Example 1, and the imaging lens 1 according to Numerical Example 1 obviously has a superior image-forming performance.

Numerical Example 2

Table 3 describes lens data of Numerical Example 2 in which specific numerical values are applied to an imaging lens 2 illustrated in FIG. 7.

In the imaging lens 2 illustrated in FIG. 7, the first lens group GP1 is configured by, in order from the object side toward the image side, a first lens L1 in a meniscus shape having negative refractive power and having a convex surface toward the object side, a second lens L2 having negative refractive power, and a third lens L3 having positive refractive power.

The second lens group GP2 is configured by, in order from the object side toward the image side, a fourth lens L4 having positive refractive power, a fifth lens L5 having negative refractive power, and a sixth lens L6 having a lens surface on the image side in a concave shape toward the image side near the optical axis and in a convex shape toward the image side near the peripheral part.

In the imaging lens 2, an aspheric surface is formed on both faces of each lens of the third lens L3 to the sixth lens L6. Table 4 describes values of aspheric surface coefficients A3 to A20 in each of the aspheric surfaces, together with values of the conic constant K.

Further, values of each of the F number, the focal distance f of the entire lens system, and the entire field angle 2$\omega$ in the diagonal direction are described as follows.

$F = 2.84$ $f = 1.380$ $2\omega = 146.0°$

TABLE 3

| | | | Example 2 | | | |
|---|---|---|---|---|---|---|
| GPi | Si | Ri | Aspheric Surface | di | ni | vi |
| GP1 | 1 | 11.413 | | 1.00 | 1.593 | 68.6 |
| | 2 | 3.500 | | 2.57 | | |
| | 3 | 12.725 | | 0.60 | 1.497 | 81.6 |
| | 4 | 1.973 | | 1.08 | | |
| | 5 | 5.080 | ASP | 1.27 | 1.821 | 24.1 |
| | 6 | 6.023 | ASP | 1.11 | | |
| | 7 | STO | | 0 | | |
| GP2 | 8 | 2.928 | ASP | 1.14 | 1.497 | 81.6 |
| | 9 | −1.091 | ASP | 0.32 | | |
| | 10 | 2000 | ASP | 0.60 | 1.923 | 20.9 |
| | 11 | 3.686 | ASP | 0.75 | | |
| | 12 | 1.475 | ASP | 0.53 | 1.535 | 55.7 |
| | 13 | 1.385 | ASP | 0.61 | | |
| | 14 | ∞ | | 0.11 | 1.517 | 64.2 |
| | 15 | ∞ | | 0.30 | | |
| | 16 | IMG | | | | |

TABLE 4

| | | Example 2 | | | |
|---|---|---|---|---|---|
| Si | K | A3 | A4 | A5 | A6 |
| 5 | 0 | 0 | 1.080E−02 | 0 | −2.456E−04 |
| 6 | 13.3157 | 0 | 1.300E−02 | 0 | −1.398E−02 |
| 8 | −9.9395 | 0 | −7.685E−02 | 0 | −1.232E−01 |
| 9 | 0.2660 | 0 | 1.560E−01 | 0 | −6.362E−02 |
| 10 | −10.0000 | 0 | 5.617E−02 | 0 | −2.573E−02 |
| 11 | 5.2286 | 0 | −5.083E−02 | 0 | 1.261E−01 |
| 12 | −5.2110 | 1.729E−02 | −7.240E−02 | −6.239E−02 | 6.085E−02 |
| 13 | −0.7359 | 5.298E−02 | −3.727E−01 | 2.390E−01 | −9.618E−02 |
| Si | A7 | A8 | A9 | A10 | A11 |
| 5 | 0 | 4.694E−05 | 0 | 9.682E−07 | 0 |
| 6 | 0 | 3.984E−03 | 0 | −1.420E−03 | 0 |
| 8 | 0 | 8.819E−03 | 0 | −3.686E−01 | 0 |
| 9 | 0 | −1.752E−02 | 0 | 1.167E−01 | 0 |
| 10 | 0 | −4.927E−02 | 0 | 4.262E−02 | 0 |
| 11 | 0 | −1.284E−01 | 0 | 5.217E−02 | 0 |
| 12 | −2.929E−02 | −1.314E−03 | 2.699E−02 | −1.718E−02 | 2.019E−03 |
| 13 | 3.704E−02 | −1.933E−02 | 1.059E−02 | −2.234E−03 | −3.132E−04 |
| Si | A12 | A13 | A14 | A15 | A16 |
| 5 | 0 | 0 | 0 | 0 | 0 |
| 6 | 0 | 0 | 0 | 0 | 0 |
| 8 | 0 | 0 | 0 | 0 | 0 |
| 9 | 0 | 0 | 0 | 0 | 0 |
| 10 | 0 | 0 | 0 | 0 | 0 |
| 11 | 0 | 0 | 0 | 0 | 0 |
| 12 | 8.133E−05 | −1.141E−05 | 2.404E−11 | 3.588E−12 | 1.088E−12 |
| 13 | −1.351E−04 | −5.539E−05 | 2.274E−05 | 1.156E−05 | 7.787E−06 |
| Si | A17 | A18 | A19 | A20 |
| 5 | 0 | 0 | 0 | 0 |
| 6 | 0 | 0 | 0 | 0 |
| 8 | 0 | 0 | 0 | 0 |
| 9 | 0 | 0 | 0 | 0 |
| 10 | 0 | 0 | 0 | 0 |
| 11 | 0 | 0 | 0 | 0 |
| 12 | 8.382E−14 | 6.550E−15 | 5.638E−16 | 5.747E−17 |
| 13 | 2.827E−06 | 2.801E−08 | −1.507E−07 | −6.132E−07 |

FIG. 8 illustrates various types of aberrations in Numerical Example 2. Further, FIGS. 9 and 10 each illustrate lateral aberrations in Numerical Example 2. FIG. 9 illustrates lateral aberrations in a state where the vibration isolation angle (blurring correction angle) or the visual field variation angle is 0 (deg). FIG. 10 illustrates lateral aberrations in a state during the vibration isolation or during the variation in the visual field.

As appreciated from the respective aberration diagrams, the respective aberrations are favorably corrected in the imaging lens 2 according to Numerical Example 2, and the imaging lens 2 according to Numerical Example 2 obviously has a superior image-forming performance.

Numerical Example 3

Table 5 describes lens data of Numerical Example 3 in which specific numerical values are applied to an imaging lens 3 illustrated in FIG. 11.

In the imaging lens 3 illustrated in FIG. 11, the first lens group GP1 is configured by, in order from the object side toward the image side, a first lens L1 in a meniscus shape having negative refractive power and having a convex surface toward the object side, and a second lens L2 having positive refractive power.

The second lens group GP2 is configured by, in order from the object side toward the image side, a third lens L3 having positive refractive power, a fourth lens L4 having negative refractive power, a fifth lens L5 having positive refractive power, and a sixth lens L6 having a lens surface on the image side in a concave shape toward the image side near the optical axis and in a convex shape toward the image side near the peripheral part.

In the imaging lens 3, an aspheric surface is formed on both faces of each lens of the second lens L2 to the sixth lens L6. Table 6 describes values of aspheric surface coefficients A3 to A16 in each of the aspheric surfaces, together with values of the conic constant K.

Further, values of each of the F number, the focal distance f of the entire lens system, and the entire field angle 2ω in the diagonal direction are described as follows.

$F=2.80$ $f=1.879$ $2\omega=106.9°$

TABLE 5

Example 3

| GPi | Si | Ri | Aspheric Surface | di | ni | vi |
|---|---|---|---|---|---|---|
| GP1 | 1 | 8.570 | | 0.40 | 1.720 | 43.7 |
| | 2 | 1.982 | | 1.43 | | |
| | 3 | 2.794 | ASP | 0.63 | 1.609 | 26.7 |
| | 4 | 9.380 | ASP | 0.83 | | |
| | 5 | STO | | 0.00 | | |
| GP2 | 6 | 1.527 | ASP | 0.58 | 1.535 | 56.3 |
| | 7 | −1.678 | ASP | 0.02 | | |
| | 8 | −4.587 | ASP | 0.33 | 1.650 | 21.5 |
| | 9 | 2.925 | ASP | 0.54 | | |
| | 10 | −2.055 | ASP | 0.42 | 1.535 | 56.3 |
| | 11 | −0.876 | ASP | 0.10 | | |
| | 12 | 1.734 | ASP | 0.40 | 1.535 | 56.3 |
| | 13 | 0.713 | ASP | 0.62 | | |
| | 14 | ∞ | | 0.11 | 1.5168 | 64.2 |
| | 15 | ∞ | | 0.30 | | |
| | 16 | IMG | | | | |

TABLE 6

Example 3

| Si | K | A3 | A4 | A5 | A6 |
|---|---|---|---|---|---|
| 3 | 0 | 0 | 6.205E−03 | 0 | 8.639E−04 |
| 4 | 5.8185 | 0 | 6.469E−03 | 0 | −6.879E−03 |
| 6 | −1.2189 | 0 | −4.803E−02 | 0 | −2.253E−01 |
| 7 | 3.9351 | 0 | −2.956E−02 | 0 | −4.868E−02 |
| 8 | 8.5370 | −9.864E−03 | −8.711E−02 | −5.303E−02 | 5.629E−02 |
| 9 | −3.5547 | 8.385E−04 | −2.264E−02 | 5.898E−02 | −2.010E−02 |
| 10 | 0.3880 | −2.958E−03 | 2.241E−01 | −1.407E−01 | −1.018E−01 |
| 11 | −3.9231 | −3.817E−02 | 1.116E−02 | 6.996E−02 | −1.003E−01 |
| 12 | −7.2741 | −7.002E−02 | −1.615E−01 | 4.146E−02 | 1.450E−02 |
| 13 | −4.5683 | 1.803E−02 | −2.868E−01 | 2.124E−01 | −2.912E−02 |

| Si | A7 | A8 | A9 | A10 | A11 |
|---|---|---|---|---|---|
| 3 | 0 | 7.124E−04 | 0 | −7.928E−04 | 0 |
| 4 | 0 | −6.155E−04 | 0 | 1.190E−04 | 0 |
| 6 | 0 | 7.912E−02 | 0 | −1.905E+00 | 0 |
| 7 | 0 | −1.402E−01 | 0 | 7.972E−02 | 0 |
| 8 | 1.013E−01 | 6.332E−02 | −2.387E−02 | 2.231E−01 | 0 |
| 9 | −4.414E−03 | 1.052E−01 | 1.269E−01 | −6.554E−02 | 0 |
| 10 | −3.897E−02 | 6.446E−02 | 6.518E−02 | −1.354E−01 | 0 |
| 11 | 4.233E−02 | 2.592E−02 | 2.345E−02 | −1.334E−01 | 0 |
| 12 | 3.305E−02 | 3.056E−03 | −6.068E−03 | −4.057E−03 | −3.135E−03 |
| 13 | −2.225E−02 | −1.033E−03 | 3.750E−03 | 8.136E−04 | 1.150E−04 |

| Si | A12 | A13 | A14 | A15 | A16 |
|---|---|---|---|---|---|
| 3 | 0 | 0 | 0 | 0 | 0 |
| 4 | 0 | 0 | 0 | 0 | 0 |
| 6 | 5.277E−03 | 0 | 1.129E−03 | 0 | 0 |
| 7 | −1.819E−02 | 0 | 6.589E−03 | 0 | 1.871E−02 |
| 8 | 0 | 0 | 0 | 0 | 0 |
| 9 | 0 | 0 | 0 | 0 | 0 |
| 10 | 0 | 0 | 0 | 0 | 0 |
| 11 | 0 | 0 | 0 | 0 | 0 |
| 12 | 2.257E−03 | 0 | 0 | 0 | 0 |
| 13 | −3.251E−04 | 0 | 0 | 0 | 0 |

FIG. 12 illustrates various types of aberrations in Numerical Example 3. Further, FIGS. 13 and 14 each illustrate lateral aberrations in Numerical Example 3. FIG. 13 illustrates lateral aberrations in a state where the vibration isolation angle (blurring correction angle) or the visual field variation angle is 0 (deg). FIG. 14 illustrates lateral aberrations in a state during the vibration isolation or during the variation in the visual field.

As appreciated from the respective aberration diagrams, the respective aberrations are favorably corrected in the imaging lens 3 according to Numerical Example 3, and the imaging lens 3 according to Numerical Example 3 obviously has a superior image-forming performance.

Numerical Example 4

Table 7 describes lens data of Numerical Example 4 in which specific numerical values are applied to an imaging lens 4 illustrated in FIG. 15.

In the imaging lens 4 illustrated in FIG. 15, the first lens group GP1 is configured by, in order from the object side toward the image side, a first lens L1 in a meniscus shape having negative refractive power and having a convex surface toward the object side, and a second lens L2 having positive refractive power.

The second lens group GP2 is configured by, in order from the object side toward the image side, a third lens L3 having positive refractive power, a fourth lens L4 having negative refractive power, a fifth lens L5 having positive refractive power, and a sixth lens L6 having a lens surface on the image side in a concave shape toward the image side near the optical axis and in a convex shape toward the image side near the peripheral part.

In the imaging lens 4, an aspheric surface is formed on both faces of each lens of the second lens L2 to the sixth lens L6. Table 8 describes values of aspheric surface coefficients A3 to A16 in each of the aspheric surfaces, together with values of the conic constant K.

Further, values of each of the F number, the focal distance f of the entire lens system, and the entire field angle 2ω in the diagonal direction are described as follows.

F=2.82 f=2.255

2ω=90.2°

TABLE 7

Example 4

| GPi | Si | Ri | Aspheric Surface | di | ni | vi |
|---|---|---|---|---|---|---|
| GP1 | 1 | 4.962 | | 0.40 | 1.720 | 43.7 |
| | 2 | 1.881 | | 1.13 | | |
| | 3 | 2.533 | ASP | 0.57 | 1.609 | 26.7 |
| | 4 | 3.968 | ASP | 0.86 | | |
| | 5 | STO | | 0.00 | | |
| GP2 | 6 | 1.535 | ASP | 0.72 | 1.535 | 56.3 |
| | 7 | −1.801 | ASP | 0.02 | | |
| | 8 | −10.589 | ASP | 0.38 | 1.650 | 21.5 |
| | 9 | 2.660 | ASP | 0.62 | | |
| | 10 | −2.700 | ASP | 0.47 | 1.535 | 56.3 |
| | 11 | −0.965 | ASP | 0.10 | | |
| | 12 | 2.097 | ASP | 0.40 | 1.535 | 56.3 |
| | 13 | 0.735 | ASP | 0.61 | | |
| | 14 | ∞ | | 0.11 | 1.5168 | 64.2 |
| | 15 | ∞ | | 0.30 | | |
| | 16 | IMG | | | | |

TABLE 8

Example 4

| Si | K | A3 | A4 | A5 | A6 |
|---|---|---|---|---|---|
| 3 | 0 | 0 | 1.111E−02 | 0 | 3.119E−03 |
| 4 | 6.8917 | 0 | 1.335E−03 | 0 | −5.877E−03 |
| 6 | −0.8578 | 0 | −3.541E−02 | 0 | −1.730E−01 |
| 7 | 3.5730 | 0 | −2.662E−02 | 0 | −1.602E−02 |
| 8 | −4.6377 | −1.248E−02 | −8.209E−02 | −5.940E−02 | 3.279E−02 |
| 9 | −3.5852 | −5.807E−04 | −2.237E−02 | 6.094E−02 | −2.002E−02 |
| 10 | 1.8255 | −9.137E−03 | 1.809E−01 | −1.421E−01 | −8.861E−02 |
| 11 | −4.7339 | −3.273E−02 | 1.245E−02 | 5.644E−02 | −1.168E−01 |
| 12 | −10.0000 | −6.046E−02 | −1.775E−01 | 4.299E−02 | 1.860E−02 |
| 13 | −4.6262 | 1.484E−02 | −2.795E−01 | 2.050E−01 | −2.454E−02 |

| Si | A7 | A8 | A9 | A10 | A11 |
|---|---|---|---|---|---|
| 3 | 0 | 1.352E−03 | 0 | −1.867E−04 | 0 |
| 4 | 0 | 2.385E−03 | 0 | −3.205E−03 | 0 |
| 6 | 0 | 2.238E−01 | 0 | −9.943E−01 | 0 |
| 7 | 0 | −9.856E−01 | 0 | 4.302E−02 | 0 |
| 8 | 7.025E−02 | 3.125E−02 | −7.432E−02 | 8.394E−02 | 0 |
| 9 | −1.571E−02 | 7.840E−02 | 1.006E−01 | −3.821E−02 | 0 |
| 10 | −3.417E−02 | 5.865E−02 | 6.448E−02 | −1.091E−01 | 0 |
| 11 | 2.878E−02 | 1.785E−02 | 2.166E−02 | −1.013E−02 | 0 |
| 12 | 3.397E−02 | 2.985E−03 | −6.378E−03 | −4.233E−03 | −3.167E−03 |
| 13 | −2.115E−02 | −2.061E−03 | 3.717E−03 | 6.239E−04 | 1.606E−04 |

| Si | A12 | A13 | A14 | A15 | A16 |
|---|---|---|---|---|---|
| 3 | 0 | 0 | 0 | 0 | 0 |
| 4 | 0 | 0 | 0 | 0 | 0 |
| 6 | 5.277E−03 | 0 | 1.129E−03 | 0 | 0 |
| 7 | 1.819E−02 | 0 | 6.589E−03 | 0 | 1.871E−02 |
| 8 | 0 | 0 | 0 | 0 | 0 |
| 9 | 0 | 0 | 0 | 0 | 0 |
| 10 | 0 | 0 | 0 | 0 | 0 |
| 11 | 0 | 0 | 0 | 0 | 0 |
| 12 | 2.270E−03 | 0 | 0 | 0 | 0 |
| 13 | −2.879E−04 | 0 | 0 | 0 | 0 |

FIG. 16 illustrates various types of aberrations in Numerical Example 4. Further, FIGS. 17 and 18 each illustrate lateral aberrations in Numerical Example 4. FIG. 17 illustrates lateral aberrations in a state where the vibration isolation angle (blurring correction angle) or the visual field variation angle is 0 (deg). FIG. 18 illustrates lateral aberrations in a state during the vibration isolation or during the variation in the visual field.

As appreciated from the respective aberration diagrams, the respective aberrations are favorably corrected in the imaging lens 4 according to Numerical Example 4, and the imaging lens 4 according to Numerical Example 4 obviously has a superior image-forming performance.

Numerical Example 5

Table 9 describes lens data of Numerical Example 5 in which specific numerical values are applied to an imaging lens 5 illustrated in FIG. 19.

In the imaging lens 5 illustrated in FIG. 19, the first lens group GP1 is configured by, in order from the object side toward the image side, a first lens L1 in a meniscus shape having positive refractive power and having a convex surface toward the object side, and a second lens L2 having negative refractive power.

The second lens group GP2 is configured by, in order from the object side toward the image side, a third lens L3 having positive refractive power, a fourth lens L4 having negative refractive power, a fifth lens L5 having positive refractive power, and a sixth lens L6 having a lens surface on the image side in a concave shape toward the image side near the optical axis and in a convex shape toward the image side near the peripheral part.

In the imaging lens 5, an aspheric surface is formed on both faces of each lens of the first lens L1, and the third lens L4 to the sixth lens L6. Table 10 describes values of aspheric surface coefficients A3 to A16 in each of the aspheric surfaces, together with values of the conic constant K.

Further, values of each of the F number, the focal distance f of the entire lens system, and the entire field angle 2ω in the diagonal direction are described as follows.

$F=2.84$ $f=2.804$ $2\omega=52.9°$

TABLE 9

Example 5

| GPi | Si | Ri | Aspheric Surface | di | ni | vi |
|---|---|---|---|---|---|---|
| GP1 | 1 | 4.021 | ASP | 1.00 | 1.583 | 59.5 |
|  | 2 | 1000 | ASP | 0.15 |  |  |
|  | 3 | 5.370 |  | 0.50 | 1.731 | 40.5 |
|  | 4 | 1.787 |  | 1.20 |  |  |
|  | 5 | STO |  | 0.00 |  |  |
| GP2 | 6 | 1.199 | ASP | 0.53 | 1.535 | 56.3 |
|  | 7 | −2.282 | ASP | 0.05 |  |  |
|  | 8 | −12.256 | ASP | 0.30 | 1.635 | 24.0 |
|  | 9 | 2.731 | ASP | 0.49 |  |  |
|  | 10 | −2.657 | ASP | 0.51 | 1.535 | 56.3 |
|  | 11 | −0.383 | ASP | 0.12 |  |  |
|  | 12 | 2.836 | ASP | 0.33 | 1.535 | 56.3 |
|  | 13 | 0.649 | ASP | 0.34 |  |  |
|  | 14 | ∞ |  | 0.11 | 1.5168 | 64.2 |
|  | 15 | ∞ |  | 0.30 |  |  |
|  | 16 | IMG |  |  |  |  |

TABLE 10

Example 5

| Si | K | A3 | A4 | A5 | A6 |
|---|---|---|---|---|---|
| 1 | 0 | 0 | 2.172E−03 | 0 | −9.892E−06 |
| 2 | 0 | 0 | 1.132E−02 | 0 | −3.044E−03 |
| 6 | −0.2538 | 0 | −1.161E−01 | 0 | −3.012E−01 |
| 7 | 10.0000 | 0 | −1.909E−01 | 0 | −4.199E−01 |
| 8 | 10.0000 | 1.781E−04 | −7.032E−02 | −8.775E−02 | −6.802E−02 |
| 9 | 2.2778 | 2.277E−02 | 1.904E−02 | 3.339E−01 | −1.463E−01 |
| 10 | 5.1076 | −2.590E−02 | 1.517E−01 | −4.455E−01 | −6.348E−02 |
| 11 | −5.0897 | −1.554E−01 | −8.603E−02 | 3.948E−01 | −7.673E−01 |
| 12 | 2.5205 | −2.488E−01 | −4.722E−01 | 4.283E−01 | −2.345E−02 |
| 13 | −4.4850 | −1.042E−01 | −4.621E−01 | 6.883E−01 | −2.932E−01 |

| Si | A7 | A8 | A9 | A10 | A11 |
|---|---|---|---|---|---|
| 1 | 0 | −2.218E−05 | 0 | 9.850E−06 | 0 |
| 2 | 0 | 6.506E−04 | 0 | −5.605E−05 | 0 |
| 6 | 0 | −3.263E−01 | 0 | −3.049E+00 | 0 |
| 7 | 0 | 1.190E+00 | 0 | −1.542E+00 | 0 |
| 8 | 1.764E−01 | 8.293E−01 | −1.167E+00 | 1.997E+00 | 0 |
| 9 | −4.843E−01 | 3.462E−01 | 1.135E+00 | 5.030E−01 | 0 |
| 10 | 1.129E−01 | 1.151E−01 | 4.615E−02 | −7.870E−01 | 0 |
| 11 | 5.199E−01 | −8.330E−02 | 2.120E−01 | −2.034E−01 | 0 |
| 12 | 1.289E−01 | −2.023E−01 | −1.143E−01 | 2.377E−02 | −1.189E−02 |
| 13 | −9.783E−02 | 1.131E−01 | −4.244E−02 | 2.805E−02 | −1.118E−02 |

| Si | A12 | A13 | A14 | A15 | A16 |
|---|---|---|---|---|---|
| 1 | 0 | 0 | 0 | 0 | 0 |
| 2 | 0 | 0 | 0 | 0 | 0 |
| 6 | 8.421E−01 | 0 | 4.531E−01 | 0 | 0 |
| 7 | −2.903E+00 | 0 | 2.645E+00 | 0 | 1.889E+01 |
| 8 | 0 | 0 | 0 | 0 | 0 |
| 9 | 0 | 0 | 0 | 0 | 0 |
| 10 | 0 | 0 | 0 | 0 | 0 |
| 11 | 0 | 0 | 0 | 0 | 0 |
| 12 | 1.240E−02 | 0 | 0 | 0 | 0 |
| 13 | −5.001E−04 | 0 | 0 | 0 | 0 |

FIG. 20 illustrates various types of aberrations in Numerical Example 5. Further, FIGS. 21 and 22 each illustrate lateral aberrations in Numerical Example 5. FIG. 21 illustrates lateral aberrations in a state where the vibration isolation angle (blurring correction angle) or the visual field variation angle is 0 (deg). FIG. 22 illustrates lateral aberrations in a state during the vibration isolation or during the variation in the visual field.

As appreciated from the respective aberration diagrams, the respective aberrations are favorably corrected in the imaging lens 5 according to Numerical Example 5, and the imaging lens 5 according to Numerical Example 5 obviously has a superior image-forming performance.

Numerical Example 6

Table 11 describes lens data of Numerical Example 5 in which specific numerical values are applied to an imaging lens 6 illustrated in FIG. 23.

In the imaging lens 6 illustrated in FIG. 23, the first lens group GP1 is configured by, in order from the object side toward the image side, a first lens L1 in a meniscus shape having negative refractive power and having a convex surface toward the object side, a second lens L2 having negative refractive power, and a third lens L3 having positive refractive power.

The second lens group GP2 is configured by, in order from the object side toward the image side, a doublet including a fourth lens L4 having positive refractive power and a fifth lens L5 having negative refractive power, and a sixth lens L6 in a meniscus shape.

In the imaging lens 6, an aspheric surface is formed on a face of the fourth lens L4 on the object side and on a face of the fifth lens L5 on the image side as well as on both faces of the sixth lens L6. Table 12 describes values of aspheric surface coefficients A3 to A10 in these aspheric surfaces, together with values of the conic constant K.

Further, values of each of the F number, the focal distance f of the entire lens system, and the entire field angle $2\omega$ in the diagonal direction are described as follows.

$F=2.84$ $f=1.902$ $2\omega=156.0°$

TABLE 11

Example 6

| GPi | Si | Ri | Aspheric Surface | di | ni | vi |
|---|---|---|---|---|---|---|
| GP1 | 1 | 16.243 |  | 0.80 | 1.639 | 55.4 |
|  | 2 | 3.556 |  | 2.71 |  |  |
|  | 3 | −11.348 |  | 0.80 | 1.497 | 81.6 |
|  | 4 | 3.372 |  | 1.20 |  |  |
|  | 5 | 3.667 |  | 1.84 | 1.850 | 32.3 |
|  | 6 | 56.981 |  | 1.04 |  |  |
|  | 7 | STO |  | 0.15 |  |  |
| GP2 | 8 | −5.464 | ASP | 1.89 | 1.694 | 53.2 |
|  | 9 | −1.251 |  | 0.56 | 1.923 | 20.9 |
|  | 10 | −2.288 | ASP | 0.10 |  |  |
|  | 11 | 4.833 | ASP | 1.72 | 1.821 | 42.7 |
|  | 12 | 7.324 | ASP | 2.50 |  |  |
|  | 13 | ∞ |  | 0.30 | 1.517 | 64.2 |
|  | 14 | ∞ |  | 0.39 |  |  |
|  | 15 | IMG |  |  |  |  |

TABLE 12

Example 6

| Si | K | A3 | A4 | A5 | A6 |
|---|---|---|---|---|---|
| 8 | 0 | 0 | −1.665E−02 | 0 | −1.542E−02 |
| 10 | 0 | 0 | −1.120E−03 | 0 | −4.245E−04 |
| 11 | 0 | 0 | 1.472E−03 | 0 | 7.740E−04 |
| 12 | 0 | 0 | 3.148E−03 | 0 | 9.463E−04 |

| Si | A7 | A8 | A9 | A10 |
|---|---|---|---|---|
| 8 | 0 | 3.038E−02 | 0 | −2.101E−02 |
| 10 | 0 | 1.431E−04 | 0 | −1.012E−04 |
| 11 | 0 | −1.513E−04 | 0 | 1.155E−05 |
| 12 | 0 | 3.309E−05 | 0 | −1.137E−05 |

FIG. 24 illustrates various types of aberrations in Numerical Example 6. Further, FIGS. 25 and 26 each illustrate lateral aberrations in Numerical Example 6. FIG. 25 illustrates lateral aberrations in a state where the vibration isolation angle (blurring correction angle) or the visual field variation angle is 0 (deg). FIG. 26 illustrates lateral aberrations in a state during the vibration isolation or during the variation in the visual field.

As appreciated from the respective aberration diagrams, the respective aberrations are favorably corrected in the imaging lens 6 according to Numerical Example 6, and the imaging lens 6 according to Numerical Example 6 obviously has a superior image-forming performance.

[Other Numerical Data of Examples]

Table 13 summarizes values related to the above-described conditional expressions for each of the numerical examples. As appreciated from Table 13, the values in each of the numerical examples fall within the numerical ranges for the conditional expressions.

TABLE 13

| Conditional Expression | | Example 1 | Example 2 | Example 3 | Example 4 | Example 5 | Example 6 |
|---|---|---|---|---|---|---|---|
| (1) | f/f1 | −0.250 | −0.487 | −0.117 | −0.259 | −0.186 | 0.024 |
| (2) | f/f2 | 0.656 | 0.693 | 0.802 | 1.009 | 1.398 | 0.521 |

4. Other Embodiments

The technique of the disclosure is not limited to the foregoing description of the embodiments and the examples, and various modifications may be made.

For example, shapes and numerical values of each member described in the foregoing respective numerical examples are mere examples of embodiment for carrying out the present technology. The technical scope of the present technology should not be limitedly construed on the basis of the shape and the numerical value of each member described in the foregoing respective numerical examples.

Moreover, for example, the present technology may have the following configurations.

[1]

An imaging unit including:

an imaging lens including a first lens group and a second lens group that are disposed in order from object side toward image side; and an imaging device that converts an optical image formed by the imaging lens into an electric signal, in which the second lens group and the imaging device are rotationally moved integrally to allow the second lens group and the imaging device to be tilted with respect to an optical axis of the first lens group.

[2]

The imaging unit according to [1], in which the first lens group is fixed when the second lens group and the imaging device are rotationally moved integrally.

[3]

The imaging unit according to [1] or [2], in which the imaging lens further includes an aperture stop disposed between the first lens group and the second lens group.

[4]

The imaging unit according to [3], in which a center of the rotational movement when the second lens group and the imaging device are rotationally moved integrally is a point near a position, on the optical axis of the first lens group, at which the aperture stop is disposed.

[5]

The imaging unit according to [3] or [4], in which the aperture stop rotationally moves integrally with the second lens group and the imaging device.

[6]

The imaging unit according to any one of [1] to [5], in which the following conditional expressions are satisfied, $$f/f1 < 0.10 \tag{1}$$

$$f/f2 < 1.40 \tag{2}$$

where f denotes a focal distance of an entire system of the imaging lens, f1 denotes a focal distance of the first lens group, and f2 denotes a focal distance of the second lens group.

[7]

The imaging unit according to any one of [1] to [6], in which the second lens group is moved in an optical axis direction of the second lens group to perform focusing.

[8]

The imaging unit according to any one of [1] to [7], in which a surface of a lens, of the second lens group, that is closest to the image side is in a concave shape toward the image side near an optical axis of the second lens group and is in a convex shape toward the image side near a peripheral part.

[9]

The imaging unit according to any one of [1] to [8], in which the second lens group includes a plastic lens on side closest to the image side.

[10]

The imaging unit according to any one of [1] to [9], in which an outer diameter of the first lens group as a whole is larger than an outer diameter of the second lens group as a whole, and the first lens group includes a glass lens on side closest to the object side.

[11]

An imaging unit according to any one of [1] to [10], in which the first lens group is configured by, in order from the object side toward the image side, a first lens in a meniscus shape having negative refractive power and having a convex surface toward the object side, a second lens having negative refractive power, and a third lens having positive refractive power, and the second lens group is configured by a fourth lens having positive refractive power, a fifth lens having negative refractive power, a sixth lens having positive refractive power, and a seventh lens having negative refractive power near an optical axis, the seventh lens having a lens surface on the image side in a concave shape toward the image side near the optical axis and in a convex shape toward the image side near a peripheral part.

[12]

The imaging unit according to any one of [1] to [11], in which the second lens group and the imaging device are rotationally moved integrally to perform a blurring correction of a photographed image or to vary a visual field.

[13]

An imaging apparatus including:

an imaging lens including a first lens group and a second lens group that are disposed in order from object side toward image side;

an imaging device that converts an optical image formed by the imaging lens into an electric signal; and an arithmetic unit that corrects an image captured by the imaging device], in which the second lens group and the imaging device are rotationally moved integrally to allow the second lens group and the imaging device to be tilted with respect to an optical axis of the first lens group.

[14]

The imaging apparatus according to [13], in which the arithmetic unit corrects a photographed image having asymmetric distortion with respect to a central axis of an imaging plane of the imaging device, the photographed image being generated by rotationally moving the second lens group and the imaging device integrally.

This application is based upon and claims the benefit of priority of the Japanese Patent Application No. 2015-083177 filed with the Japan Patent Office on Apr. 15, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging unit, comprising:
an imaging lens including a first lens group and a second lens group that are arranged in order from an object side of the imaging unit toward an image side of the imaging unit, wherein
the second lens group includes a first lens,
a central portion of a first surface, of the first lens, has a concave shape toward the image side,
a peripheral portion of the first surface, of the first lens, has a convex shape toward the image side,
an optical axis of the second lens group is closer to the central portion of the first surface than the peripheral portion of the first surface, and
the image side is closer to the first surface of the first lens than a second surface of the first lens,
the imaging lens is configured to form an optical image; and
an imaging device configured to convert the optical image into an electric signal, wherein
the second lens group and the imaging device are configured to rotationally and integrally move to tilt the second lens group and the imaging device to be tilted with respect to an optical axis of the first lens group.

2. The imaging unit according to claim 1, wherein the first lens group is fixed with respect to the optical axis of the first lens group.

3. The imaging unit according to claim 1, wherein the imaging lens further includes an aperture stop between the first lens group and the second lens group.

4. The imaging unit according to claim 3, wherein
the aperture stop is at a position on the optical axis of the first lens group, and
a center of a rotational movement of the second lens group and the imaging device is at a point near the position.

5. The imaging unit according to claim 3, wherein the aperture stop is configured to rotationally and integrally move with the second lens group and the imaging device.

6. The imaging unit according to claim 1, wherein the following conditional expressions are satisfied, $$f/f1 < 0.10 \tag{1}$$

$$f/f2 < 1.40 \tag{2}$$

where
f denotes a focal distance of an entire system of the imaging lens,
f1 denotes a focal distance of the first lens group, and
f2 denotes a focal distance of the second lens group.

7. The imaging unit according to claim 1, wherein the imaging lens is focused based on a movement of the second lens group toward the first lens group, in an optical axis direction of the second lens group.

8. The imaging unit according to claim 1, wherein the first lens of the second lens group is a plastic lens.

9. The imaging unit according to claim 1, wherein
an outer diameter of the first lens group as a whole is larger than an outer diameter of the second lens group as a whole, and
the first lens group includes a glass lens on a first side of the first lens group, and
the object side is closer to the first side of the first lens group than a second side of the first lens group.

10. The imaging unit according to claim 1, wherein
the first lens group comprises, in order from the object side toward the image side,
a first lens of a meniscus shape having negative refractive power, and a convex surface toward the object side,
a second lens having negative refractive power, and
a third lens having positive refractive power; and
the second lens group further comprises:
a second lens having positive refractive power,
a third lens having negative refractive power,
a fourth lens having positive refractive power, and
a wherein the first lens has negative refractive power at the central portion.

11. The imaging unit according to claim 1, wherein the second lens group and the imaging device are configured to rotationally and integrally move for one of a blurring correction of a photographed image or variation of a visual field.

12. An imaging apparatus, comprising:
an imaging lens including a first lens group and a second lens group that are arranged in order, from an object side toward an image side of the imaging lens, wherein
the second lens group includes a first lens,
a central portion of a first surface, of the first lens, has a concave shape toward the image side,
a peripheral portion of the first surface, of the first lens, has a convex shape toward the image side,
an optical axis of the second lens group is closer to the central portion of the first surface than the peripheral portion of the first surface, and
the image side is closer to the first surface of the first lens than a second surface of the first lens,
the imaging lens is configured to form an optical image;
an imaging device configured to convert the optical image into an electric signal; and
an arithmetic unit configured to correct an image captured by the imaging device,
wherein the second lens group and the imaging device are configured to rotationally and integrally move to tilt the second lens group and the imaging device with respect to an optical axis of the first lens group.

13. The imaging apparatus according to claim 12, wherein
the arithmetic unit is configured to correct a photographed image having asymmetric distortion with respect to a central axis of an imaging plane of the imaging device, and
the photographed image is generated based on integrated rotational movement of the second lens group and the imaging device.

14. An imaging unit, comprising:
an imaging lens including a first lens group and a second lens group that are arranged in order from an object side of the imaging unit toward an image side of the imaging unit, wherein following conditional expressions are satisfied, $$f/f1 < 0.10 \qquad (1)$$

$$f/f2 < 1.40 \qquad (2)$$

where
f denotes a focal distance of an entire system of the imaging lens,
f1 denotes a focal distance of the first lens group,
f2 denotes a focal distance of the second lens group, and
the imaging lens is configured to form an optical image; and
an imaging device configured to convert the optical image lens into an electric signal, wherein
the second lens group and the imaging device are configured to rotationally and integrally move to tilt the second lens group and the imaging device with respect to an optical axis of the first lens group.

15. An imaging unit, comprising:
an imaging lens including a first lens group and a second lens group that are disposed in order from an object side of the imaging unit toward an image side of the imaging unit, wherein
the first lens group comprises:
a first lens of a meniscus shape having negative refractive power, and a convex surface toward the object side,
a second lens having negative refractive power, and
a third lens having positive refractive power, and
the second lens group comprises:
a first lens having positive refractive power,
a second lens having negative refractive power,
a third lens having positive refractive power,
a fourth lens having negative refractive power at a central portion of the fourth lens,
the fourth lens comprises a lens surface, on the image side, having a concave shape in the central portion and having a convex shape in a peripheral portion of the fourth lens, and
the imaging lens is configured to form an optical image; and
an imaging device configured to convert the optical image into an electric signal, wherein
the second lens group and the imaging device are configured to rotationally and integrally to tilt the second lens group and the imaging device with respect to an optical axis of the first lens group.

* * * * *